United States Patent [19] [11] 4,163,286

Reins et al. [45] Jul. 31, 1979

[54] DIGITAL PLOTTING SYSTEM FOR DISPLAYING STRAIGHT LINE INFORMATION

[75] Inventors: Edward R. Reins, Monterey; Charles D. B. Curry, Pacifica, both of Calif.

[73] Assignee: The United States of America as represented by the Secretary of the Navy, Washington, D.C.

[21] Appl. No.: 851,022

[22] Filed: Nov. 14, 1977

[51] Int. Cl.[2] .............................................. G06F 3/14

[52] U.S. Cl. .................................... 364/719; 364/718

[58] Field of Search .............................. 364/719, 718; 340/324 R, 324 A

[56] References Cited

U.S. PATENT DOCUMENTS

| | | | |
|---|---|---|---|
| 3,735,389 | 5/1973 | Tarczy-Hornock ............ | 340/324 A |
| 3,883,728 | 5/1975 | Schwartz et al. .......... | 340/324 R X |
| 4,023,027 | 5/1977 | Strathman et al. ................ | 364/719 |

*Primary Examiner*—David H. Malzahn

*Attorney, Agent, or Firm*—R. S. Sciascia; Charles D. B. Curry

[57] ABSTRACT

A digital plotting system for displaying straight line information. This system employs a long vector to describe a long straight line on a graph that starts from any point, extends in any direction and has a specific length. The direction is implemented by an eight 45° quadrant system wherein the specific angle within a particular quadrant is derived from binary slope storage and rate generator devices and is referenced from either a vertical adjacent line or a horizontal adjacent line. The long vector logic is compatible for use with a digital plotting system for displaying all forms of graphic information including curved lines, straight lines and characters.

17 Claims, 38 Drawing Figures

DIGITAL FORMAT FOR ALPHANUMERIC SYMBOLS

FIG _ 4 LONG VECTOR MESSAGE

| $K_2$ | $K_1$ | $K_0$ |
|---|---|---|
| 0 | 0 | 0 |
| 0 | 0 | 1 |
| 0 | 1 | 0 |
| 0 | 1 | 1 |
| 1 | 0 | 0 |
| 1 | 0 | 1 |
| 1 | 1 | 0 |
| 1 | 1 | 1 |

SHORT VECTOR MESSAGE

| $S_1$ | $S_0$ | GRID SIZE |
|---|---|---|
| 0 | 0 | 0.01" |
| 0 | 1 | 0.02" |
| 1 | 0 | 0.03" |
| 1 | 1 | 0.04" |
FIG _ 8
| INITIAL VECTOR DEFINITION $A_3$ | $A_2$ | $A_1$ | INITIAL VECTOR DIRECTION |
|---|---|---|---|
| 0 | 0 | 0 | 0° |
| 0 | 0 | 1 | +45° |
| 0 | 1 | 0 | +90° |
| 0 | 1 | 1 | +135° |
| 1 | 0 | 0 | +180° |
| 1 | 0 | 1 | +225° |
| 1 | 1 | 0 | +270° |
| 1 | 1 | 1 | +315° |
FIG _ 9A FIG _ 9B
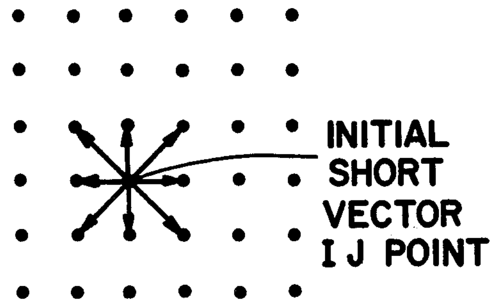
FIG _ 10
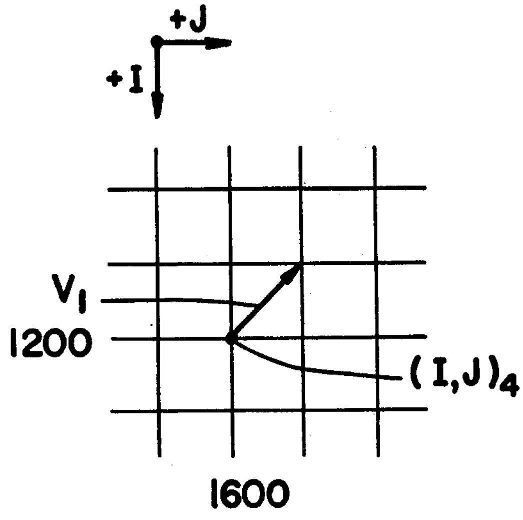
FIG _ 11

EXAMPLES OF +45° TURNS

EXAMPLES OF -45° TURNS

+90° TURNS

-90° TURNS

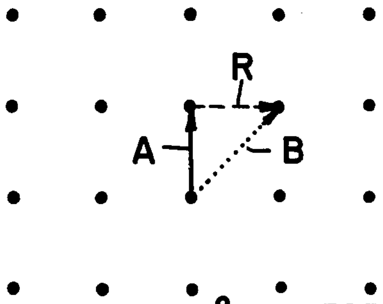
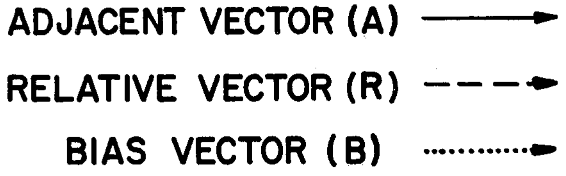
ORTHOGONAL 90° VECTOR SUBSTITUTION
FIG _ 16
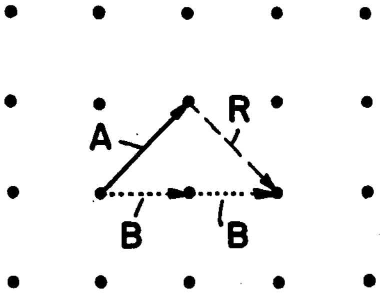
FIG _ 17
BIAS 90° VECTOR SUBSTITUTION
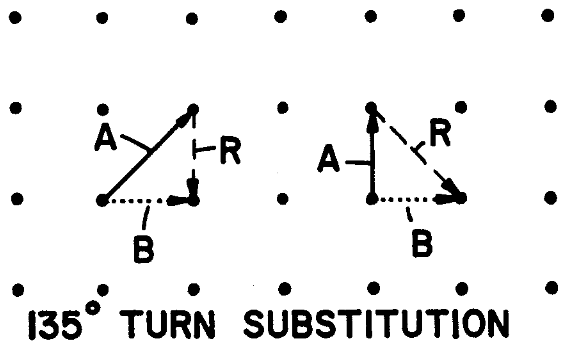
135° TURN SUBSTITUTION
FIG _ 18
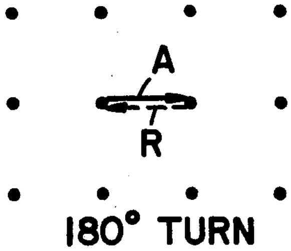
180° TURN
FIG _ 19
| RELATIVE VECTOR | BIT VALUE | ODD / EVEN VECTOR |
|---|---|---|
| TREND | 0 | O,E |
| -45° EXCEPTION | 1 | O |
| +45° EXCEPTION | 1 | E |
FIG _ 20

| SHORT VECTOR DATA BIT NUMBER | ODD OR EVEN | BINARY NUMBER | DIRECTION |
|---|---|---|---|
| 1 | ODD | 1 | DIRECTION DEFINED BY $A_3 A_2 A_1$ |
| 2 | EVEN | 0 | CONTINUE IN SAME DIRECTION |
| 2 | EVEN | 1 | TURN 45° CLOCKWISE |
| 3 | ODD | 0 | CONTINUE IN SAME DIRECTION |
| 3 | ODD | 1 | TURN 45° CNTR'CLK'WISE |
| 4,5,6,7, ······256 | SAME AS FOR BIT NUMBERS 2 AND 3 | | |

FIG _ 21

| SHORT VECTOR DATA BIT NUMBER | ODD OR EVEN | BINARY NUMBER | DIRECTION | |
|---|---|---|---|---|
| 1 | O | 1 | 000 ($A_3A_2A_1$) | = 0° |
| 2 | E | 0 | SAME | = 0° |
| 3 | O | 1 | -45 | = 315° |
| 4 | E | 0 | SAME | = 315° |
| 5 | O | 1 | -45 | = 270° |
| 6 | E | 1 | +45 | = 315° |
| 7 | O | 0 | SAME | = 315° |
| 8 | E | 1 | +45 | = 0° |
| 9 | O | 0 | SAME | = 0° |
| 10 | E | 1 | +45 | = 45° |
| 11 | O | 0 | SAME | = 45° |
| 12 | E | 1 | +45 | = 90° |
| 13 | O | 0 | SAME | = 90° |
| 14 | E | 0 | SAME | = 90° |
| 15 | O | 0 | SAME | = 90° |
| 16 | E | 0 | SAME | = 90° |

FIG _ 22

FIG _ 23

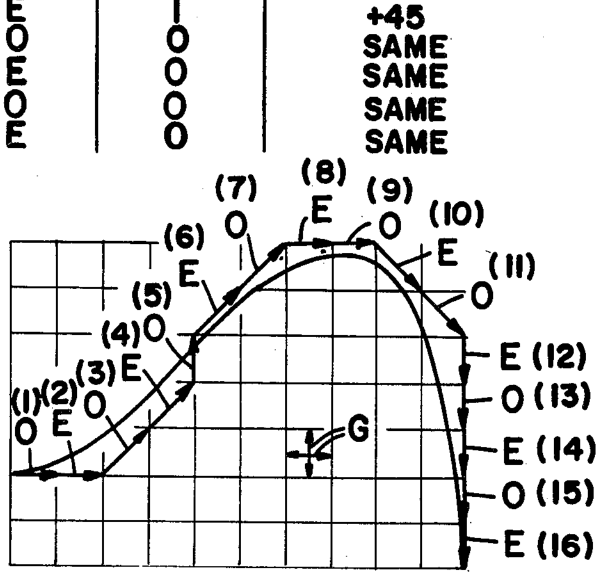

O – COUNTERCLOCK

E – CLOCK

G – GRID SIZE

CHARACTER MESSAGE

SHORT VECTOR REORGANIZED MESSAGE

| DIRECTION OF LAST (MAY BE INITIAL) VECTOR | | | DIRECTION OF NEXT ADJACENT VECTOR | | | | | | | | |
|---|---|---|---|---|---|---|---|---|---|---|---|
| | | | ODD OR EVEN BIT IS "O" TREND (O) | | | ODD BIT IS "I" DECREMENT (−) | | | EVEN BIT IS "I" INCREMENT (+) | | |
| $A_1$ | $A_2$ | $A_3$ | $a_1$ | $a_2$ | $a_3$ | $a_1$ | $a_2$ | $a_3$ | $a_1$ | $a_2$ | $a_3$ |
| 0 | 0 | 0 | 0 | 0 | 0 | 1 | 1 | 1 | 0 | 0 | 1 |
| 0 | 0 | 1 | 0 | 0 | 1 | 0 | 0 | 0 | 0 | 1 | 0 |
| 0 | 1 | 0 | 0 | 1 | 0 | 0 | 0 | 1 | 0 | 1 | 1 |
| 0 | 1 | 1 | 0 | 1 | 1 | 0 | 1 | 0 | 1 | 0 | 0 |
| 1 | 0 | 0 | 1 | 0 | 0 | 0 | 1 | 1 | 1 | 0 | 1 |
| 1 | 0 | 1 | 1 | 0 | 1 | 1 | 0 | 0 | 1 | 1 | 0 |
| 1 | 1 | 0 | 1 | 1 | 0 | 1 | 0 | 1 | 1 | 1 | 1 |
| 1 | 1 | 1 | 1 | 1 | 1 | 1 | 1 | 0 | 0 | 0 | 0 |

| A1 | A2 | A3 | I | J |
|---|---|---|---|---|
| 0 | 0 | 0 | 0 | +1 |
| 0 | 0 | 1 | +1 | +1 |
| 0 | 1 | 0 | +1 | 0 |
| 0 | 1 | 1 | +1 | -1 |
| 1 | 0 | 0 | 0 | -1 |
| 1 | 0 | 1 | 1 | -1 |
| 1 | 1 | 0 | -1 | 0 |
| 1 | 1 | 1 | -1 | +1 |

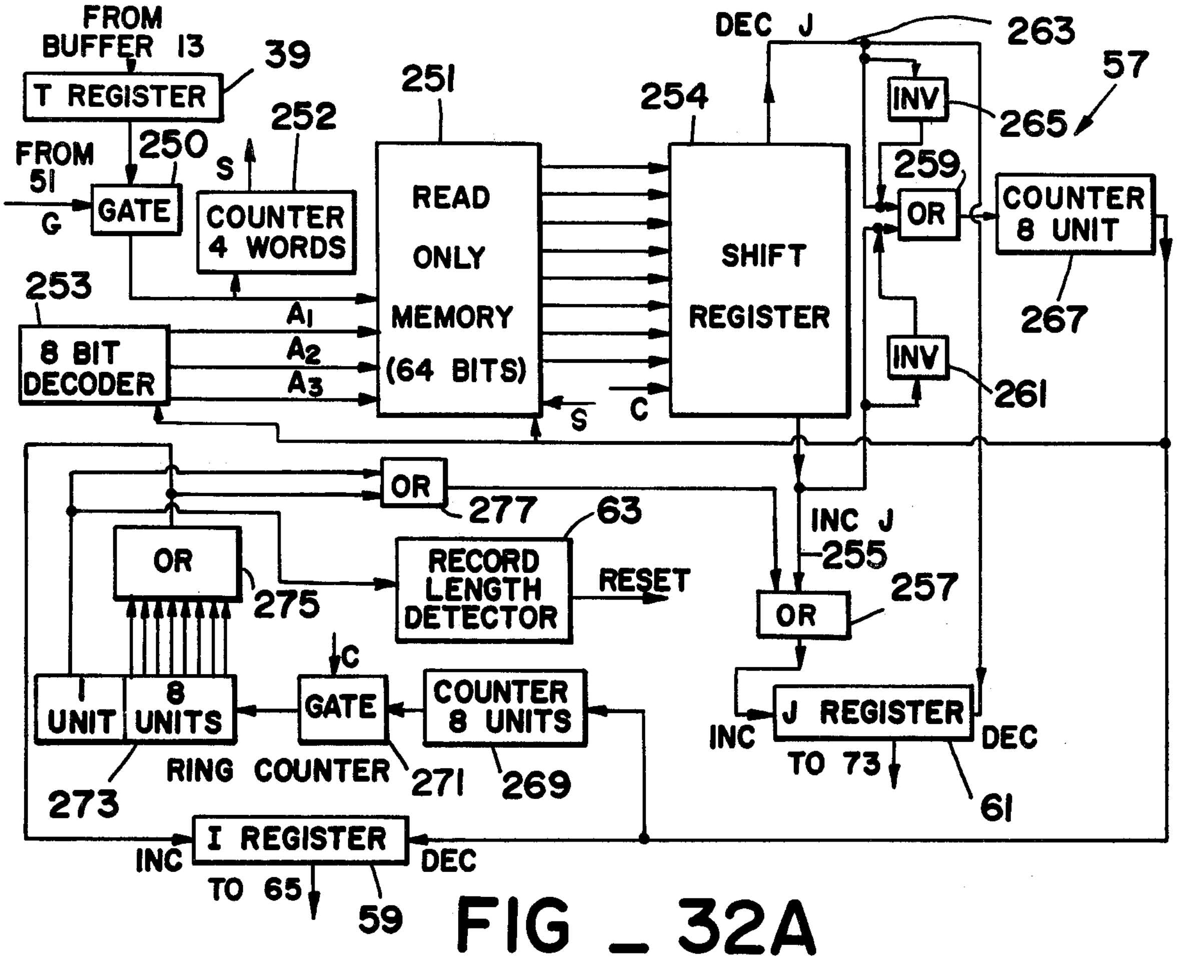
FIG _ 32A
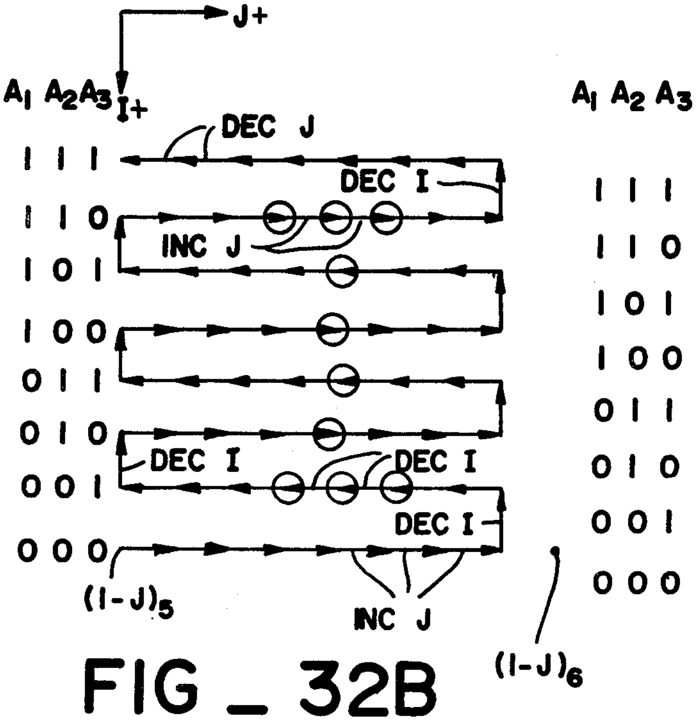
FIG _ 32B
| A1 A2 A3 | 1 | 2 | 3 | 4 | 5 | 6 | 7 | 8 |
|---|---|---|---|---|---|---|---|---|
| 1 1 1 | 0 | 0 | 0 | 0 | 0 | 0 | 0 | 0 |
| 1 1 0 | 0 | 0 | 0 | 1 | 1 | 1 | 0 | 0 |
| 1 0 1 | 0 | 0 | 0 | 0 | 1 | 0 | 0 | 0 |
| 1 0 0 | 0 | 0 | 0 | 0 | 1 | 0 | 0 | 0 |
| 0 1 1 | 0 | 0 | 0 | 0 | 1 | 0 | 0 | 0 |
| 0 1 0 | 0 | 0 | 0 | 0 | 1 | 0 | 0 | 0 |
| 0 0 1 | 0 | 0 | 0 | 1 | 1 | 1 | 0 | 0 |
| 0 0 0 | 0 | 0 | 0 | 0 | 0 | 0 | 0 | 0 |
FIG _ 32C

LONG VECTOR REORGANIZED MESSAGE

DIGITAL PLOTTING SYSTEM FOR DISPLAYING STRAIGHT LINE INFORMATION

BACKGROUND OF THE INVENTION

1. Field of the Invention

The present invention relates to a digital plotting system and more particularly to a digital plotting system for displaying straight line information.

2. Description of the Prior Art

Many attempts have been made to inexpensively and effectively transmit and display graphic type information. One well known method for doing this is with facsimile television. In a normal TV display of 525 lines this represents a transmission of about 300,000 points of data for black and white presentation. There are several ways in which television signals may be transmitted. These include microwave, telephone or teletype transmission. Microwave type transmission can very rapidly transmit 300,000 points or bits of information. However, microwave transmission requires expensive wide bandwidth (for example, 6 megacycles) equipment and involves either coaxial transmission lines or repeater stations. In addition, microwave reception is not available throughout the world as may be required in many remote locations. Therefore, facsimile graphic representation by conventional TV is not suitable where cost and worldwide availability are important factors.

It has been proposed that narrowband transmission of a binary representation of each point of each raster line may be an effective mode of transmitting graphic information. While graphic information may be transmitted by this binary representation (for example, with a binary "1" representing each dark point on the graph) it requires the narrowband transmission of approximately 300,000 points. With narrowband transmission, teletype speed being about 3,000 bits/minute, this would require about 100 minutes to transmit a single graph on a 525×525 display. For many applications this time requirement would be excessive.

While telephone lines are available they are expensive and have the limitation of being restricted to the land masses of the world. In addition, they involve a relatively narrow bandwidth of about 3 KC. This limits the transmission to about 2,400 bits/sec and requires about 2 minutes to transmit a 300,000 bit message. For many applications this time requirement, especially in view of the high cost, would be excessive.

The present invention overcomes these disadvantages by providing a digital plotting system wherein only straight line information is transmitted. This results in a very large reduction in the number of data points for an average straight line transmission with a commensurate reduction in transmission time as compared to various facsimile transmission techniques.

SUMMARY OF THE INVENTION

Briefly, the present invention comprises a digital plotting system for displaying straight line information. This systems employs a long vector to describe a long straight line on a graph that starts from any point, extends in any direction and has a specific length. The direction is implemented by an eight 45° quadrant system wherein the specific angle within a particular quadrant is derived from binary slope storage and rate generator devices and is referenced from either a vertical adjacent line or a horizontal adjacent line. The long vector logic is compatible for use with a digital plotting system for displaying all forms of graphic information including curved lines, straight lines and characters.

STATEMENT OF THE OBJECTS OF THE INVENTIONS

An object of the present invention is to provide an effective digital plotting system;

Another object of the present invention is to provide a digital plotting system for plotting straight line information;

Still another object of the present invention is to provide a digital plotting system for plotting straight line information that is compatible with a digital plotting system for plotting all forms of graphic information including curved lines, straight lines and characters;

Still another object of the present invention is to provide a digital plotting system for plotting straight line information that results in a reduction in the number of transmitted data points as compared to facsimile transmission;

A still further object of the present invention is to provide a digital plotting system that describes a long straight line starting from any point on a graph, extending in any direction and having a specific length;

A still further object of the present invention is to provide a digital plotting system for straight line information wherein the specific direction of a straight line is implemented by an eight 45° quadrant system wherein the specific angle within a particular quadrant is derived from binary slope storage and rate generator devices and is referenced from either a vertical adjacent line or a horizontal adjacent line;

Other objects, advantages and novel features of the invention will become apparent from the following detailed description of the invention when considered in conjunction with the accompanying drawings wherein:

BRIEF DESCRIPTION OF THE DRAWINGS

FIG. 4 illustrates the long vector message that is used to define straight lines;

FIG. 8 shows the coding for denoting the grid size of the short vectors;

FIGS. 9A and 9B show the coding for the initial direction of the short vector;

FIG. 10 is a diagram showing all possible directions of the initial short vector from the initial I, J point;

FIG. 11 is a diagram showing a typical initial vector;

FIGS. 12 through 19 show the eight possible directions relative to the adjacent vector direction;

FIG. 20 is a chart illustrating the short vector concept and the specific coding for the trend and exception concepts;

FIG. 21 is a chart summarizing the variable exception or short vector coding concept;

FIGS. 22 and 23 illustrate a typical example of the specific coding that is used to reproduce a curve by the variable exception short vector technique;

FIGS. 32A, 32B and 32C illustrate the detailed logic and operation of the character device of FIG. 27;

DESCRIPTION OF THE PREFERRED EMBODIMENT

The digital display system of the present invention receives and stores digital coded signals, the format of which depict alphanumeric and graphic information which are to be processed and displayed by the display system. In order to more fully appreciate and understand the inventive concepts of the present invention it is considered desirable to understand the format of the digital signals received and stored by the display system. Accordingly, the following is a discussion of the digital format and coding of the signals that represent alphanumeric information and graphic information, both of which together may make up a complete graphic display such as a weather map, that may be transmitted to the display system. It is to be understood that the physical coding for transmission may be performed manually or by conventional machine techniques and that transmission may be performed by many different conventional techniques.

At the outset it should be noted that two basic types of information are coded for transmission. These are alphanumeric information and graphic information. The teletype equipment and the alphanumeric information for operation of the teletype equipment are not considered part of the present invention but will be briefly described to more completely illustrate the operation of the display system. The alphanumeric information for operation of the teletype equipment may include letters of the alphabet, numbers, punctuation, symbols, teletype control symbols and the like.

Figure 1:
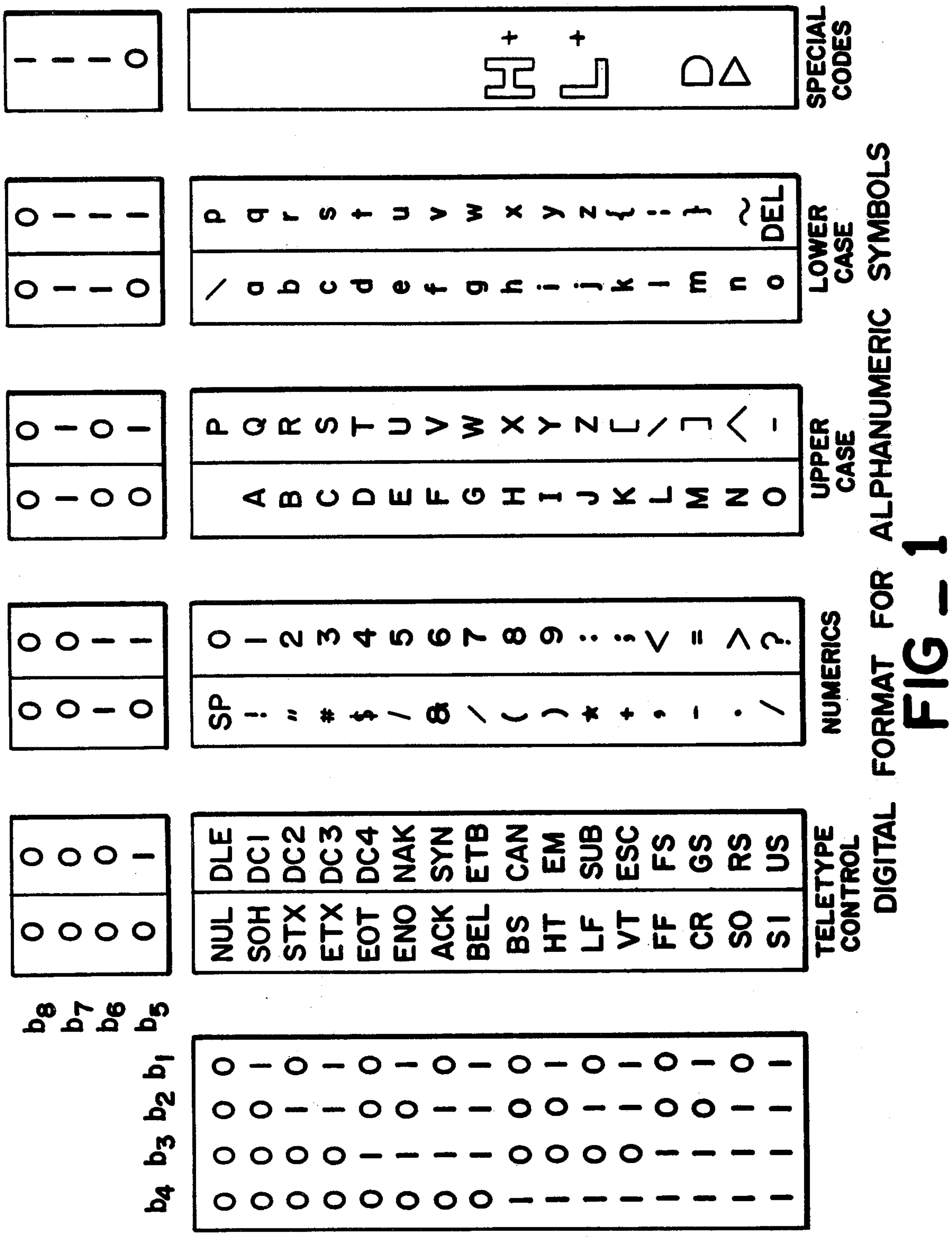
FIG. 1 is a chart illustrating a typical digital format that may be used to describe various alphanumeric symbols used by the teletype equipment in the system of the present invention.

In FIG. 1 is shown a chart illustrating a typical digital format that may be used to describe various alphanumeric symbols used by the teletype equipment. The digital formats are shown to the left and at the top of the FIG. 1 chart wherein the symbols $b_1b_2b_3b_4$ to the left and $b_5b_6b_7b_8$ at the top together represent an 8-bit binary definition of the various alphanumeric symbols illustrated. For example, the upper case letter B is defined as 01000010 for $b_1$ through $b_8$ and the symbol SUB, for example, is defined as 01011000 for $b_1$ through $b_8$.

The chart of FIG. 1 includes various control signals, numerics, upper and lower case symbols and special codes. It is to be understood that various other types of control signals, numerics, upper and lower case symbols and special codes may be used. The particular meaning of the various symbols of the chart of FIG. 1 will not be defined since they are well known to those skilled in the teletype art and are not considered part of the present invention. However, it is to be understood that the display system of the present invention makes it possible to display these same symbols on the same display as the graphic information.

The graphic related information includes three basic types of information that are used for operation of the display system of the present invention. These are (1) long vector information, (2) short vector information, and (3) alphanumeric or character information. Together these three types of information can reproduce virtually any type of graphic information that is desired to be transmitted and displayed. These three types of graphic information are coded into a digital format, then transmitted, then received by and displayed by the display system of the present invention.

The long vector information is primarily used to describe long straight lines such as horizontal or vertical margin lines, longitude lines, latitude lines, oblique lines or any other straight line type of graphic information.

The short vector information is primarily used to describe various contours, curves, isotherms, isobars and any other type of curvilinear information.

The character information (which is to be distinguished from the teletype alphanumeric information) is used to describe many types of alphanumeric symbols such as letters, numbers, and punctuation, as well as arrows, triangles and various other type symbols that may be desired to be displayed on a graph. This character information is not processed by the teletype equipment but is processed by the display system along with the long and short vector information as hereinafter described in detail.

Figure 2:
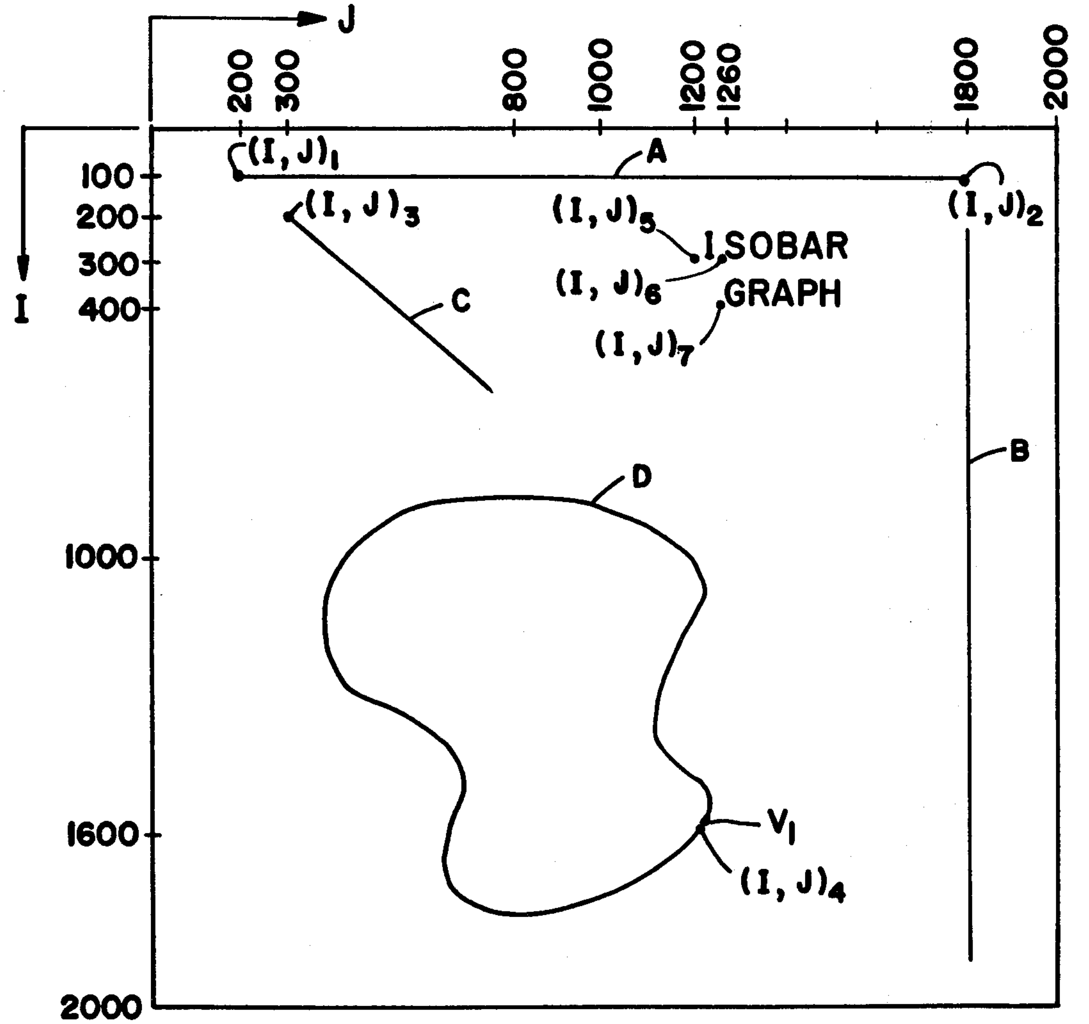
FIG. 2 is a typical graph that may be digitally coded, transmitted and then reproduced by the digital display system of the present invention.

In FIG. 2 is illustrated a typical graph that may be digitally coded, transmitted and then reproduced by the digital display system of the present invention. For purposes of illustration, the graph of FIG. 2 is selected to be a 20 inch by 20 inch graph that comprises a grid having 2000 units in the horizontal or J direction and 2000 units in the vertical or I direction. Therefore, in this graph the grid lines are 0.01 inch apart comprising a total of 2000 I lines and 2000 J lines which together form 4,000,000 intersecting points. It will be understood that these dimensions, number of grid lines, spacings, and the total number of intersecting points are given by way of illustration and different units and numbers may be selected depending upon the particular needs.

Figure 3:
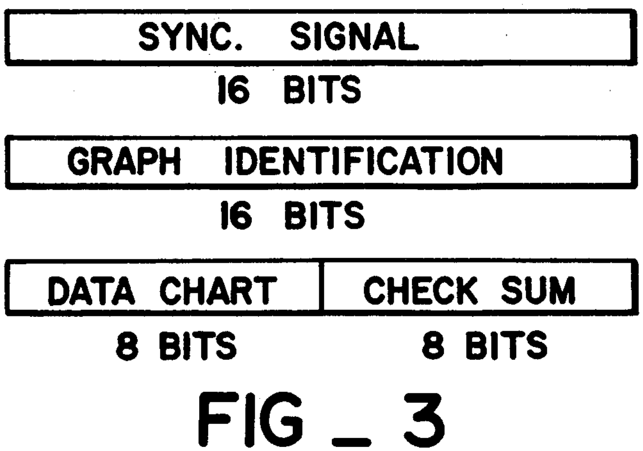
FIG. 3 is the digitally coded format that defines the graphic file information.

The digital coded format that defines the graph initially includes graphic file identification information as shown in FIG. 3. The initial signal is a conventional 16-bit synchronous signal that assures proper reception and synchronizing of the receiving equipment. The following coded information is a 16-bit graph identification that identifies whether the graph is a pressure graph, a temperature graph, a bar graph or sea height information or the like. Sea height information may be all alphanumeric information, for example, and the others may be graphic information. However, most graphic displays will include both graphic and alphanumeric information. The 8-bit data chart information is alphanumeric and may define the day, hour or location, etc. of the transmitted data. The last word is an 8-bit check sum which is a count of all of the 1's in the preceding words of the graphic file identification.

In FIG. 4 is illustrated the long vector message that is used to define straight lines. The record describing the long vectors has a total of 72 bits, for example, wherein the sequence of signals is from left to right. More specifically, the first group of signals is an 8-bit word of alternating 1's and 0's. This is a conventional type of synchronous signal that is used to assure proper reception and synchronizing of the receiving equipment. The next word is a 4-bit word that defines the FIG. 4 record as a long vector record. This is to be distinguished from the short vector record which is shown in FIG. 7 and hereinafter described in detail. The next word of the long vector record is a 12-bit word that defines the length of the long vector. This 12-bit word can describe 4096 units ($2^{12}$) wherein each unit preferably describes 0.01 inch. Therefore, a total of 40.96 inches may be described by this 12-bit word, which may define the length of any I or J line or any diagonal on a 20×20 inch graph. The next two words are each 12-bit words that define the I and J coordinates which together define any point on the graph. The next word is a 13-bit word that defines the slope of the long vector. The next word is a 3-bit word which defines the sector in which the slope is located. Together, the slope word (12-bits) and sector word (3-bits) describe all slopes within a 360° angle. This aspect of the long vector record will be more fully described in relation to FIGS. 5, 6, 33, 34 and 35. The last word is an 8-bit word which is a check sum. The check sum is a count of all of the 1's of all of the preceding words of the long vector record. The check sum is conventional practice and is used to assure that the received signal corresponds to the transmitted signal and no errors were made in transmission.

Figure 5:
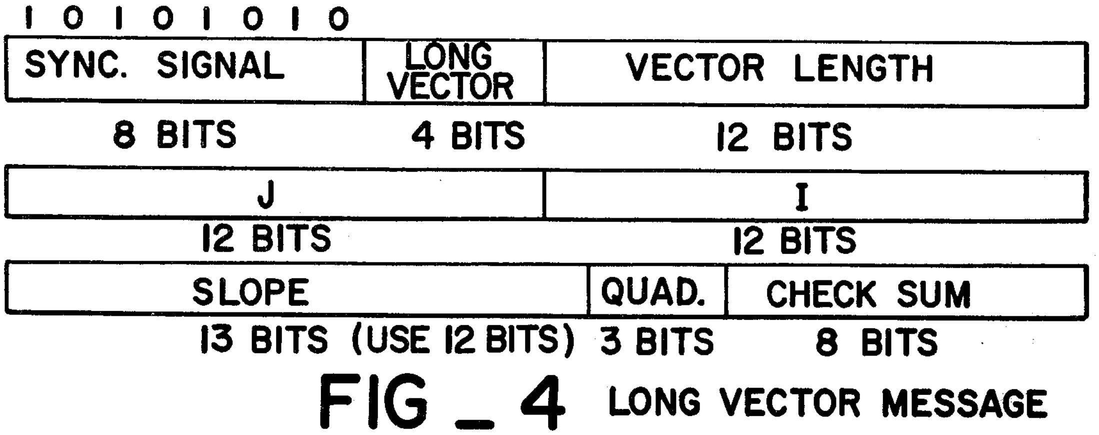
FIG. 5 and 6 show the long vector sector binary definition and long vector sector diagram.
Figure 6:
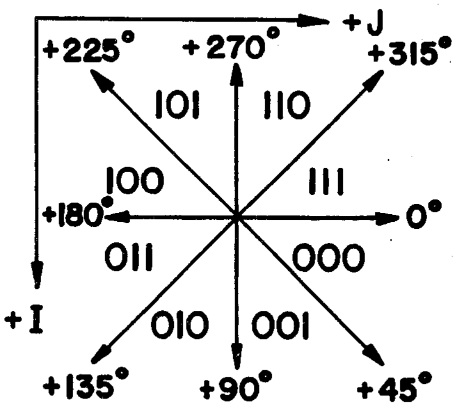
Figure 7:
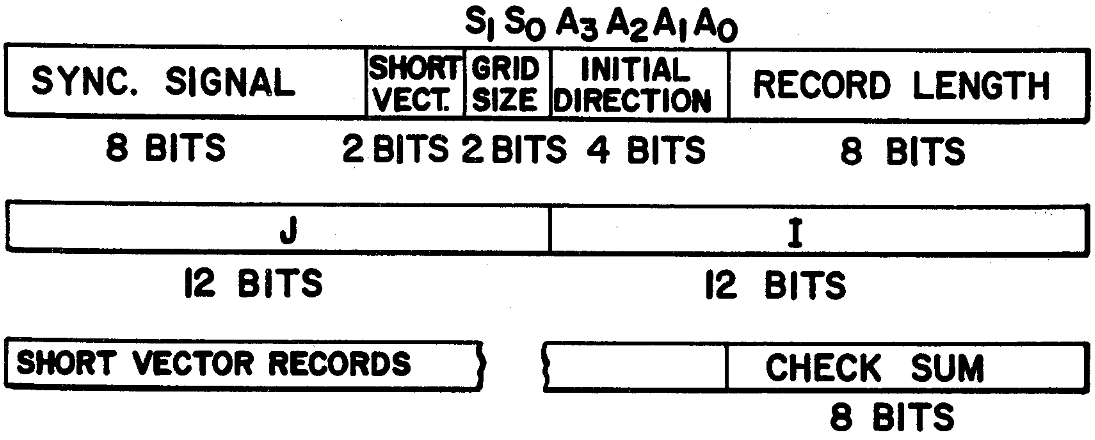
FIG. 7 is the short vector message that defines contours.

In FIGS. 5 and 6 are shown the long vector sector binary definition and the long vector sector diagram respectively. FIGS. 5 and 6 are to be taken together and from this it can be seen that the eight 45° quadrants are defined by the 3-bit sector word $K_2K_1K_0$. Therefore, the 3-bit sector word defines the quadrant of the long vector and the 13-bit slope word defines the particular angle of the long vector within the selected quadrant. From this it can be seen that each quadrant is broken up into $2^{12}$ or 4096 parts where each part is 45°/4096 or about 0.01°. Therefore, any angle of a long vector within a complete 360° circle is defined to an accuracy of within 0.01° by the above described technique.

Referring to FIG. 2, the horizontal line A, which may represent a margin, may have the length defined by a binary number representing 1600 units (or 16 inches), for example, the initial point $(I,J)_1$, defined by the binary numbers representing (100,200), for example, the slope defined as zero, and the sector as 000. The vertical line B, which may also represent a margin, may have the length defined by the binary numbers representing 1800 (or 18 inches), the initial point $(I,J)_2$ defined by the binary numbers representing (100,1800), for example, the slope defined as zero, and the sector as 010. The oblique line C may have the length defined by the binary number representing 600 (or 6 inches), for example, the initial point $(I,J)_3$ defined by the binary number representing (200,300), the slope defined as 40°, and the sector as 000. In view of the foregoing it can be seen that with relatively few bits any long vector in a 20×20 inch graph, for example, can be very accurately defined along with the logic shown and described with respect to FIGS. 33, 34 and 35.

The coded format that may be used to define contours, referred to as the short vector record, is shown in FIG. 7. Depending upon the amount of short vector data the short vector message may have a total of from about 64 bits to about 312 bits, for example, wherein the sequence of these signals is from left to right and from top to bottom. That is, the first group of signals is an 8-bit word of alternating 1's and 0's that is a synchronous signal for assuring proper reception and synchronizing of the receiver equipment. The next word is a 2-bit word (for example, 01) that defines the FIG. 7 record as a short vector record as distinguished from the long vector record of FIG. 4. The next word is a 2-bit word that defines the short vector grid size or short vector length. In FIG. 8 is shown the coding of the $S_1S_0$ positions of this word for designating short vector grid sizes or lengths of 0.1, 0.2, 0.3 and 0.4 inch. That is, the use of a short vector grid size code binary number 00, for example, will provide a short vector length of 0.1 inch and a short vector grid code binary number 10, for example, will provide an 0.3 inch short vector. Shorter grid sizes are preferably used when more accurate curve definition is required such as when the curve being defined is changing rapidly. Longer grid sizes are preferably used when less accurate curve definition is required such as when the curve being defined is changing slowly. For defining the same length of curve, the short grid sizes require more transmission data than the longer grid sizes. Since it is generally preferable to transmit the minimum amount of data it is preferable to use the longer grid sizes. However, when greater definition or accuracy is required then it is generally preferable to use the shorter grid sizes.

The next word is a 4-bit word $A_3A_2A_1A_0$ that defines the initial direction of the first short vector. In FIG. 9A is shown the coding for the $A_3A_2A_1$ bit positions of this word for designating the initial director of the first short vector. That is, the use of a short vector initial direction code binary number 000, for example, will provide a zero degree (0°) initial direction of the initial short vector. An initial direction code binary number of 111, for example, will provide an initial direction of 315°. From FIG. 9B it can be seen that a total of eight initial directions (0, 45, 90, 135, 180, 225, 270 and 315 degrees) for the initial short vector are provided. As shown in FIG. 10 this will define all eight grid points surrounding any single grid point as defined by the initial (I,J) point. This is a complete definition of all possible grid point initial directions when using an 0.1 inch short vector length. However, it may be desirable to more completely define the initial direction of the initial short vector when it has a longer length such as 0.2, 0.3 or 0.4 inches as defined in the previously described grid size word of the short vector record. Therefore, a fourth bit $A_0$ is provided where the initial direction may be defined in smaller increments. It is to be understood that more bits may be used to describe the initial direction if required.

The next word is an 8-bit word that is a binary number representing the total number of bits of short vector data in the short vector record. This is necessary for establishing the length (of the variable length) of the hereinafter described short vector data. This information is used for operation of the hereinafter described control system. The next two words are each 12-bit words that define the I and J coordinates which together define the starting grid point of the initial short vector.

The next word is an 8 to 256 bit word (1 to 32 bytes), for example, that defines the short vector data. Therefore, up to 32 bytes (256 bits) of short vector binary data are available. Preferably if the short vector data does not end on a byte boundary, zeros are filled to the end of that boundary. The coding of the short vector data, which point by point may define a curve such as an isobar D of FIG. 2, is described below. The final word is an 8-bit check sum word.

At the outset the initial short vector starting grid point is determined as described above by the initial (I,J) point and by the initial direction. This, in conjunction with the first bit in the short vector data which must be either a binary 1 or 0, establishes the first vector on the grid as indicated by the symbol $V_1$ in FIG. 11. In the following discussion and examples the first bit of short vector data will be defined as a binary 1. Referring to FIGS. 2, 7, 8, 9A, 9B and 11 (in this example the grid size word is 00) the initial direction code $A_3A_2A_1$ is the binary number 111 (+315°), the I value is the binary number representing 1600, the J value is the binary number representing 1200 (that is, $(I,J)_4$ is (1600,1200)), and the first bit of the short vector data is a binary 1. When all of the conditions are attained then the initial short vector is defined on the grid as shown in FIGS. 2 and 11.

The following is an analysis of what is herein referred to as the variable exception vector definition. This coding is used to define the remaining short vectors (the first vector being defined as described above) contained in the short vector data. This coding is based on the observation that an equipotential contour operating in a gradient field defined on an orthogonal grid is severely restricted in its point-to-point direction variation. Specifically, any defining vector outlining a contour can be constrained to within ±45° of the direction of its adjacent vector with negligible smoothing.

Figure 12:
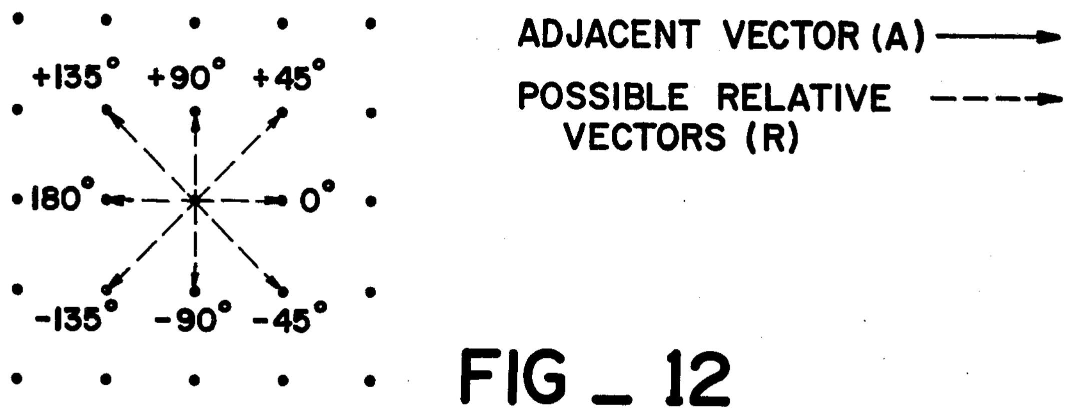

This can be seen by examining the various possible directions a vector could take in relation to its adjacent vector direction. Referring to FIG. 12, there are eight possible directions relative to the adjacent vector direction (the direction of the last defined vector) to consider, namely 0°, +45°, +90°, +135°, −45°, −90°, −135°, and 180°. In order to fully understand this definition it is necessary to investigate each of the eight possible directions as discussed below. In the discussion that follows the adjacent vector (A) is shown as a solid arrow, possible relative vectors (R) are shown as broken lines, and substitute bias vectors (B) are shown as dotted lines.

0° Direction—If the contour continues along the trend direction designated by the adjacent vector (A) the relative vector (R) is defined as having a relative direction of 0°. This is the most likely direction to occur in a smooth contour.

Figure 13:
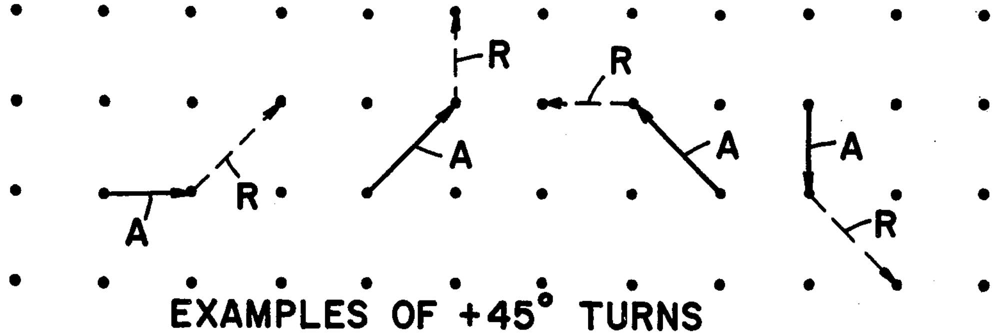
Figure 14:
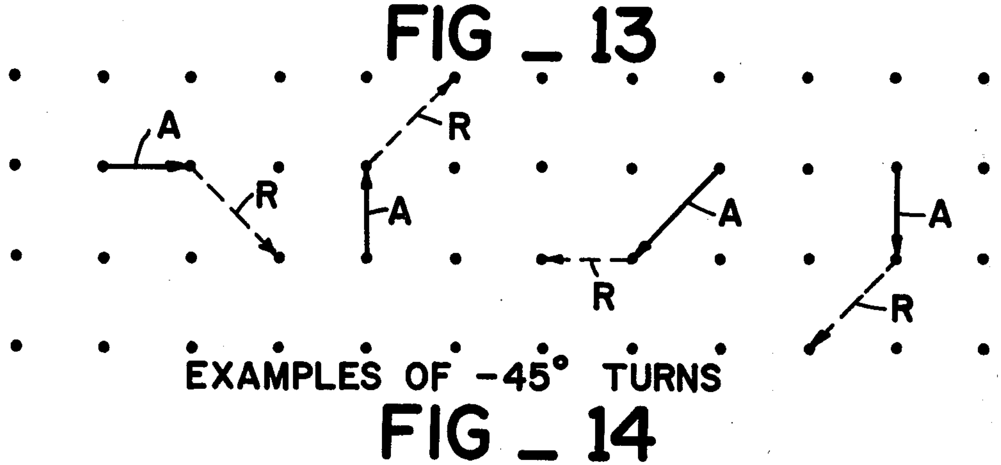

±45° Direction—When the contour makes a counter-clockwise rotation of 45° relative to the direction of the adjacent vector (A) this is defined as having a +45° relative direction. Examples of +45° relative vector (R) directions are shown in FIG. 13 by the broken line arrows. The +45° turn is typical of a contour concave to the left of the direction of adjacent vector travel. In FIG. 14 is shown the −45° turn.

Figure 15:
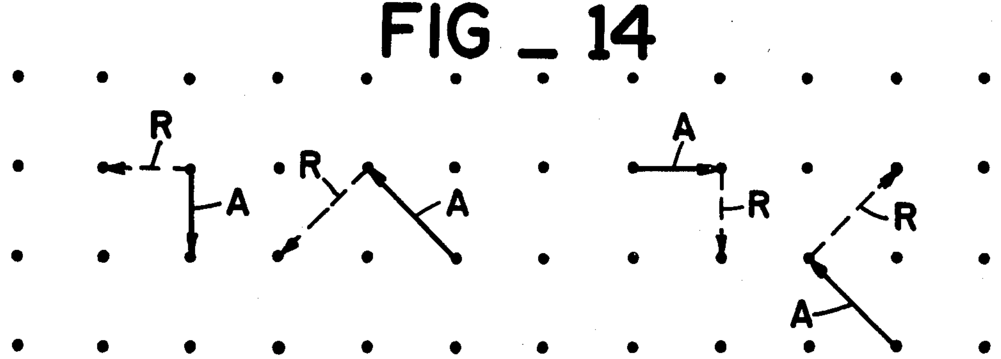

±90° Directions—Right angle turns are illustrated in FIG. 15. Here it becomes important to distinguish between orthogonal and bias turns. A 90° orthogonal turn is illustrated in FIG. 16. As can be seen, a 90° orthogonal turn can be eliminated by substituting a bias vector in its place. No distortion or smoothing occurs by this action. However, a bias 90° turn, illustrated in FIG. 17, requires two orthogonal vectors and results in missing or smoothing over an otherwise valid grid point. No distortion is introduced, however, since the two substituted bias vectors end up at the proper grid point.

±135° Directions—Relative vector turns of 135° are illustrated in FIG. 18. Here it is obvious that all 135° turns can be eliminated by substitution of a single orthogonal vector.

180° Direction—A relative vector which returns along the line traced by the adjacent vector (illustrated in FIG. 19) is clearly spurious and can be eliminated by eliminating both the adjacent vector and the relative vector. Such action will normally have no effect whatever on the data. However, a spurious grid point could possibly be removed. Such an occurrence would result in a small amount of smoothing, but no distortion.

In view of the foregoing it can be seen that by substitution, all relative vector turns can be reduced to 0°±45° without distortion and with negligible smoothing. This means that the number of directions to be defined have been reduced from 8 to 3, thus reducing the number of bits of data required from 3 to 2. In accordance with the present invention it has been discovered possible to reduce the data requirement to a single bit and still define these three directions. This discovery is based on the concept of trend and exception as discussed below.

By this concept the direction of the adjacent vector is defined as the trend direction. If the relative vector continues in this direction (0° relative vector), it is referred to as a trend vector. If, however, the relative vector turns ±45°, this is referred to as an exception vector. In order to define the two exception directions by a single bit the exception bit is time-shared by defining it to be +45° on all even vectors and −45° on all odd vectors in relationship to the most recent absolute (initial) vector. This is illustrated in the chart shown in FIG. 20.

This process does introduce some potential distortion. However, when the distortion goes out of tolerance, a new absolute vector is used to bring the contour back on target. This occurs when the curve exceeds the ±45° limits of this process.

In FIG. 21 is shown a chart that summarizes the above described coding concept. From this chart it can be seen that the first bit (bit number 1) of the short vector data stream is ODD and is always a binary 1 wherein its direction is defined by the initial direction code $A_3A_2A_1$. The short vector that is defined by the second bit (bit number 2) of the short vector data stream is EVEN and this second vector will continue in the same direction (as the immediately preceding vector) if the binary number is 0 or it will turn 45° clockwise if the second binary number is a 1. The short vector that is defined by the third bit (bit number 3) of the short vector data stream is ODD and this third vector will continue in the same direction if the binary number is 0 or it will turn 45° counterclockwise if the third binary number is a 1. This process will continue for the remaining bits of the short vector data stream, defined by bits 4, 5, 6, 7 . . . n, wherein each of these subsequent vectors will have their directions determined by whether or not the bit defining that vector is ODD or EVEN or a binary 1 or a binary 0.

In summary, when the bit is a binary 0 the vector, whether ODD or EVEN, will continue in the same direction as the immediately preceding vector. However, when the bit is a binary 1 then the vector will change its direction clockwise 45° when EVEN and counterclockwise 45° when ODD, with respect to the immediately preceding vector. It is to be understood that the short vector could be alternatively coded by the definition of counterclockwise 45° when the bit is EVEN and clockwise 45° when the bit is ODD. Also, the initial bit could be always a binary 0 rather than always a binary 1.

In FIGS. 22 and 23 as illustrated a typical example of the coding that is used to reproduce a curve by this variable exception vector coding. In this example, the curve to be defined by the short vector coding is shown as a solid curved line in FIG. 23. The short vector coding that defines this solid line curve is shown in FIG. 22 and the plotting of the short vectors in accordance with this code is shown in FIG. 23. From FIGS. 22 and 23 it can be seen that bits 1 through 16 define the solid curve shown in FIG. 23.

This is achieved by the definition of the initial direction of bit 1 and the bindary 1 or 0 definition of the remaining bits (2 through 16). That is, the first bit (1) has its initial direction defined as $A_3A_2A_1=000$. From FIGS. 9A and 9B it can be seen that this code (000) defines the 0° absolute direction which most closely approximates the first part of the solid curve of FIG. 23. The subsequent vectors have the absolute directions as shown in FIGS. 22 and 23 which most closely approximate the solid curve of FIG. 23. From FIG. 23 it can be seen that the vector representation of the curve does not exactly correspond to the smooth solid line curve of FIG. 23. However, in this example, it should be noted that if the grid size is selected to be 0.01 inch, for example, then the total length of the FIG. 23 design is about 0.1 inch and the total height is slightly less than 0.1 inch. By examination of FIG. 23 it can be seen that the maximum deviation between the actual curve and its graphic representation is about 0.01 inch which is less than can be seen by normal examination of the display screen.

Figure 24:
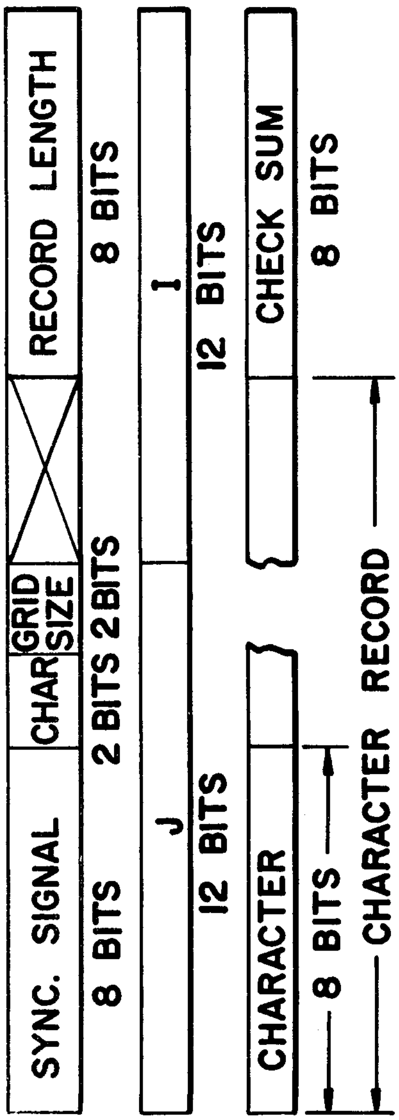
FIG. 24 is a diagram of the coded format that may be used to define alphanumeric characters.

The coded format that may be used to define alphanumeric characters, referred to as the character message, is shown in FIG. 24. The first group of signals is an 8-bit word of alternating 1's and 0's comprising a synchronous signal for assuring proper reception and synchronizing of the receiving equipment. The next word is a 2-bit word that defines the FIG. 24 message as a character message as distinguished from the previously discussed long and short vector messages. The next word is a 2-bit word that defines the character grid size. The next word is an 8-bit word that defines the character record length. The next two words are each 12-bit words that define the I and J coordinates which together define the starting grid point of the first character of the character record. The next word is an 8-bit (1 byte) to n-bit character record word, wherein 256 bits is the normal transmission length. The final word is an 8-bit check sum word.

Figure 25:
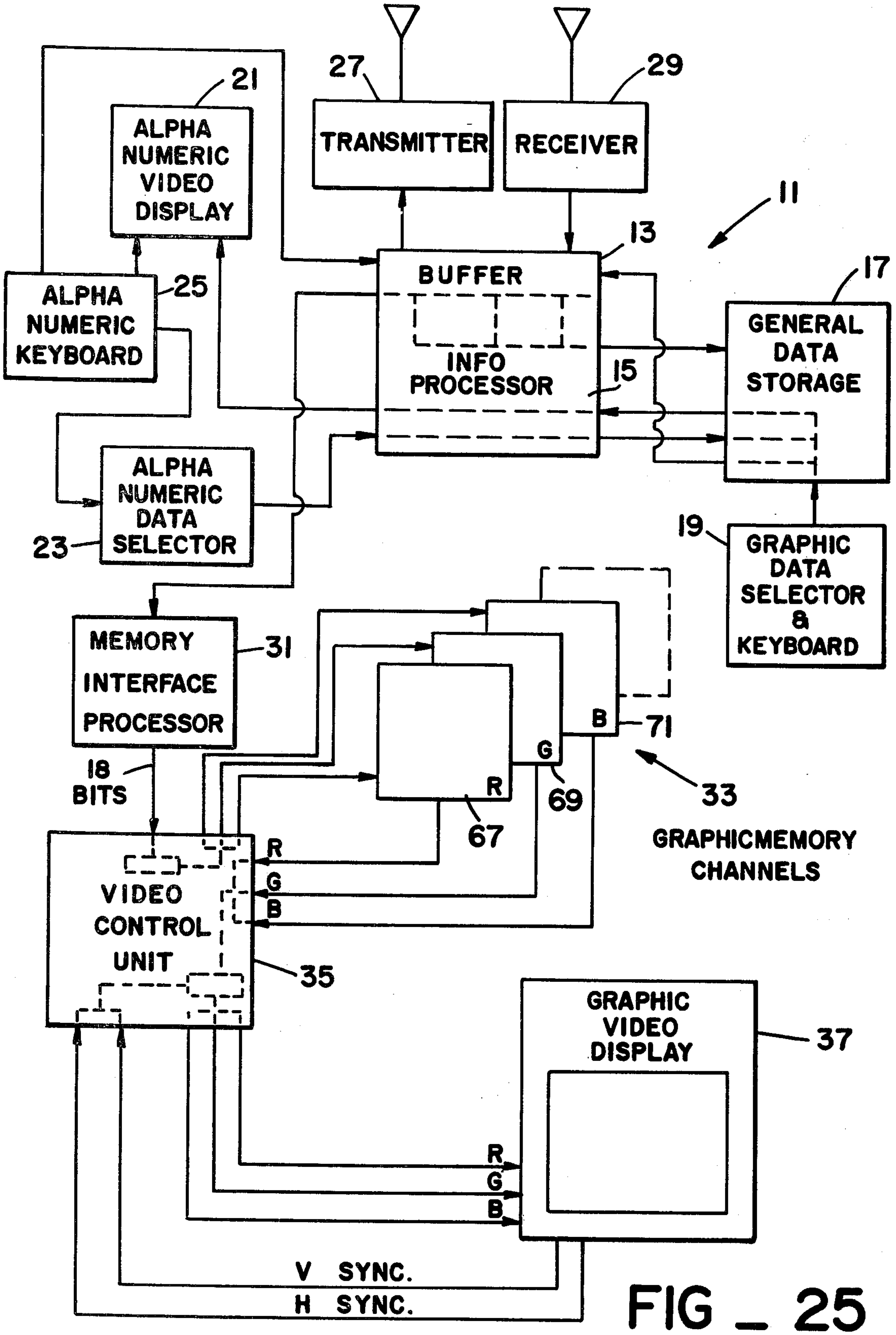
FIG. 25 is a clock diagram of the digital display system of the present invention.

In FIG. 25 is illustrated a block diagram of the digital display system 11 of the present invention. The principle components of the system include input buffer 13, information processor 15, general data storage 17, graphic data selector and keyboard 19, alphanumeric video display 21, alphanumeric data selector 23, alphanumeric keyboard 25, transmitter 27 and receiver 29. The dislay system of the present invention also includes memory interface processor 31, graphic memory channels 33, video control unit 35 and graphic video display 37.

The transmitter 27 is primarily used to transmit alphanumeric messages. The digital format of these messages are written on the alphanumeric keyboard 25 and transmitted to buffer 13 for storage and then serially transmitted by transmitter 27. It is to be understood, however, that the data in general storage 17 may be also transferred to buffer 13 for storage and then transmitted by transmitter 27.

The incoming information, both alphanumeric and graphic information, is received by receiver 29 and transferred to buffer 13 for temporary storage. It is to be understood that buffer 13 may have any size capacity depending upon the amount of incoming-outgoing information and the amount of information processed by the display system 11.

The incoming information is in coded serial bit format, of the type that was previously described in detail, and may have a bit rate from about 75 bits per second (100 words per minute for teletype), to about 9,600 bits per second or more. The separate channels of buffer 13 temporarily store the serially incoming digital information. For example, by teletype it may be necessary to store a one to thirty minute message (describing the contours of a weather map, for example) in the particular receiving buffer. After the message is received by the buffer 13 it is then addressed, reorganized, and transferred by information processor 15 and stored in general data storage 17. This process is repeated for all of the incoming coded binary messages that are received by the buffer 13. Therefore, general data storage 17 will have stored in its memory all of the coded binary messages received by buffer 13 until such time that they are no longer needed. When the data is no longer needed the tape or disc or the pertinent sections thereof may be erased, or otherwise removed.

The techniques used by the information processor 15 for addressing, reoganizing and transferring the coded digital information are well known to those skilled in the art and will therefore not be described in detail. However, it should be noted that the coded digital information describing a particular graph must be given a particular address, either manually or by machine, and be stored at that particular address in the general data storage 17. Moreover, that address must be known so that graphic data selector 19 may select that particular graph for processing and display on graphic video display 37.

It also should be noted that the selected sequence of the formats of the long vector record (FIG. 4), the short vector record (FIG. 7), and the character record (FIG. 24) were illustrated as being arranged for the most efficient transmission and having the least wasted time. However, by standard techniques, information processor 15 rearranges the formats and stores these rearranged formats in general data storage 17. For example, the short vector is rearranged to the format shown in FIG. 26. It is to be understood that the rearranged format could have been done during the original coding rather than by the information processor.

Figure 26:
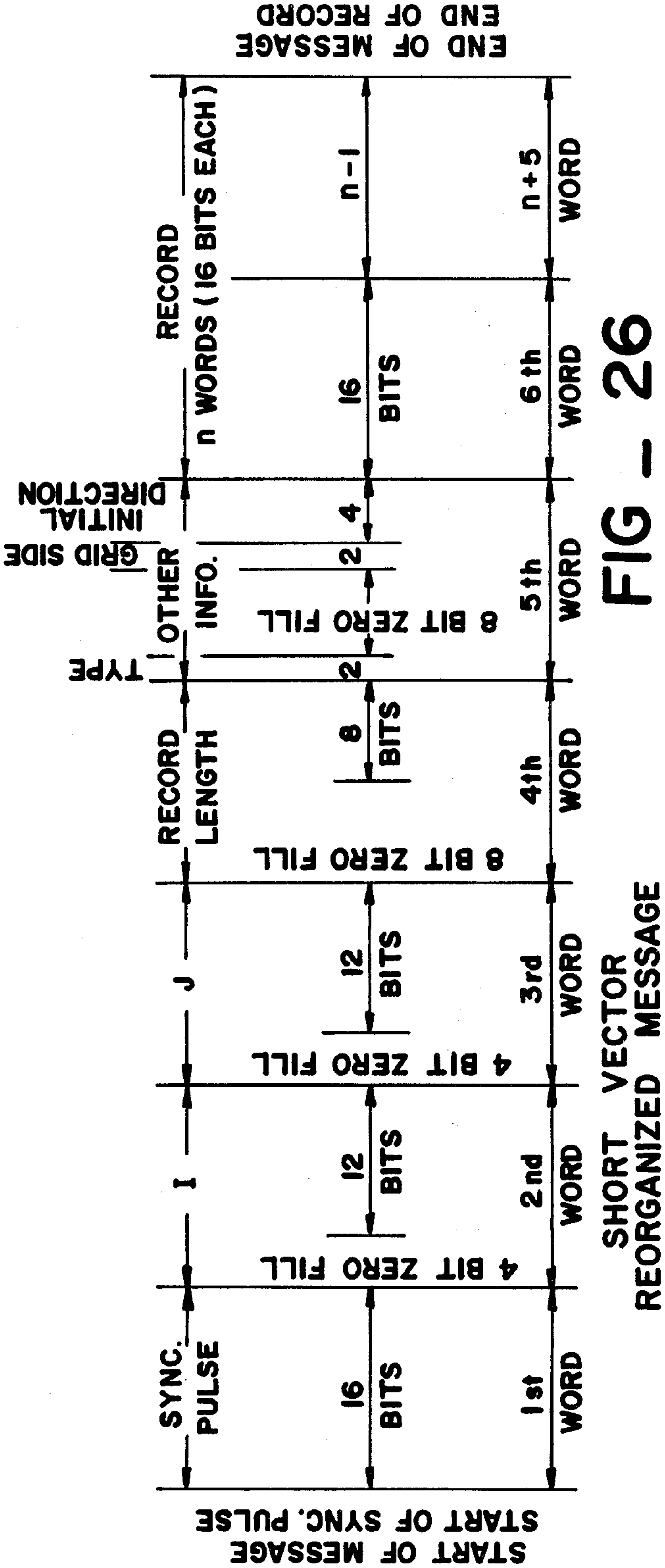
FIG. 26 is a diagram of the short vector reorganized message.

Referring to the short vector message of FIG. 26, it should be initially noted that the codes are arranged into 16-bit words and that any excess is filled with zeros, as illustrated. It also should be noted that the words are arranged in the following sequence:

| WORD | INFORMATION |
|---|---|
| 1st word | synchronous pulse (16 bits) |
| 2nd word | I definition (12 bits) |
| 3rd word | J definition (12 bits) |
| 4th word | Record length (8 bits) |
| 5th word | Type of record (2 bits) |
| | Grid size (2 bits) |
| | Initial direction (4 bits) |
| 6th word | . |
| . | Record (n 16-bit words) |
| . | . |
| n+5 word | |

This 16-bit grouping is performed because the hereinafter described processing of signals is performed in words of 16-bits each. It is to be understood that different lengths of words could be employed but the 16-bit word was selected because more available hardware is designed to process 16-bit words. From this it can be seen that the synchronous pulse is first and has 16 alternating 1 and 0 bits. Then the I (12 bits) and J (12 bits) information with 4 bits of 0 fill each, then the record length (8 bits) with 8-bits of zero fill, then the type of information (2 bits) (that is, long vector record, short vector record or character record), followed by an 8-bit 0 fill, then the grid size (2 bits) and then the initial direction (4 bits). Then the coded record follows having n words of 16-bits each.

It should be noted also that an index of alphanumeric and graphic information addresses is made by information processor 15. This index is separately stored in the storage 17 and is updated upon the storing of each new message. This is also done by conventional techniques and will therefore not be described.

Alphanumeric video display 21 is used to provide a visual display of alphanumeric information, such as the index of all graphic information, the index of all alphanumeric information, and the like. Alphanumeric information may also include any verbal or numeric written messages such as weather forecasts, indexes, observational data, administrative data and the like. Graphic information may include messages describing the isotherms, isobars, and various other isolines used in the environmental sciences. The graphic information may also include messages describing radar data, bar graphs, line graphs, satellite imagery (including shades of gray) and various other drawings and graphs that are defined by either lines or by distinguishable color/shade contrasts.

All of the information, both graphic and alphanumeric, stored in general data storage 17 is in digital format. Alphanumeric data selector 23 selects a particular address through information processor 15 which selects the proper address of general data storage 17 by conventional techniques. General data storage 17 then transmits this alphanumeric information to information processor 15 that transmits it for display by alphanumeric video display 21.

When graphic data selector 19 selects a particular address, by manual or automatic techniques, this results in the serial transfer (16 bits at a time or 1 word) of the digital information (describing some form of a graphic representation or character representation normally superposed on a graph) to the input of buffer 13, where it is temporarily stored. After storage in buffer 13 this information is then transferred to memory interface processor 31 which will be hereinafter described in detail. The operation of this transfer and storage is done by conventional techniques and will not be described.

It should be noted that an alphanumeric keyboard 25 is provided for writing alphanumeric messages. The output of the alphanumeric keyboard may be both transmitted by transmitter 27 and or displayed on alphanumeric video player 21 (when selected by alphanumeric data selector 23). This is also done by conventional techniques and will therefore not be described in detail.

The output of memory interface processor 31 is applied to the input of video control unit 35 which, by conventional techniques, addresses the output of the proper graphic memory channels 33 as shown by the dotted lines. It should be noted that it is conventional practice to synchronize the memory plane stored information with the vertical and horizontal signals of the video display. This is generally shown in FIG. 25 by the vertical and horizontal synchronous signals from video display 37 being mixed with the memory plane signals in video control unit 35 as shown by the dotted lines.

Figure 27:
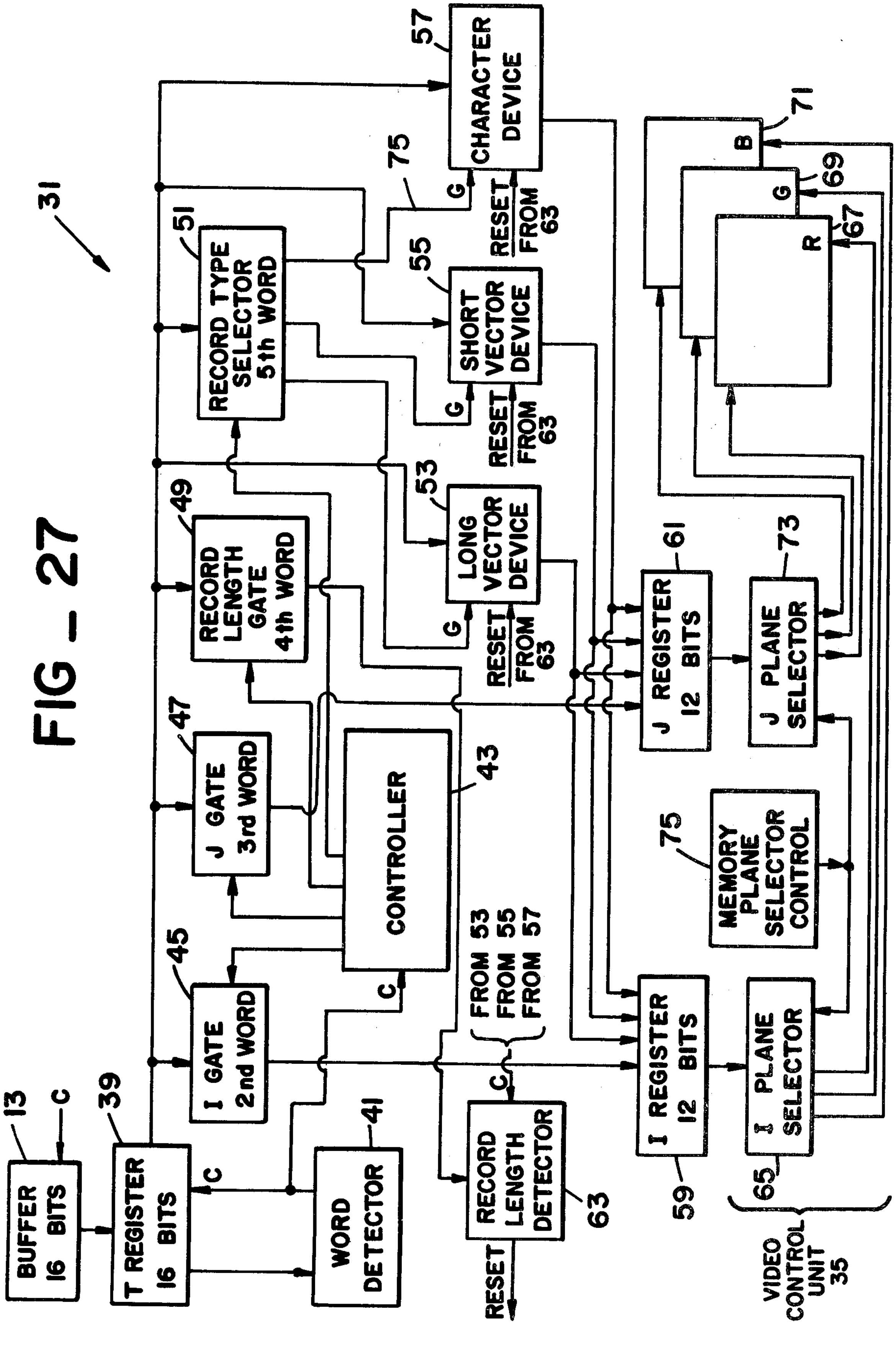
FIG. 27 is a block diagram of the memory interface processor of the present invention.

In FIG. 27 is shown a block diagram of the memory interface processor 31 of the present invention. This includes a T register 39 that receives information, in 16-bit words, from buffer 13 of FIG. 25. Word detector 41 initially scans the incoming 16-bit group for the synchronous signal of alternating ones and zeros which comprise the first word. When the 16-bit synchronous pulse group is detected then processor 31 sequentially processes the remainder of the message. For example, assuming the message is the short vector message of FIG. 26 then processor 31 will sequentially process the I word, the J word, the record length, the type of record, the grid size, the initial direction and the record. Word detector 41 provides a series of clock signals C, each clock signal in response to register 39 receiving a new word, for the processing of the message.

Word detector 41 provides a clock signal (C) that is applied to the clock inputs of T register 39 and controller 43. It will be apparent to one skilled in the art that the clock signal (C) may also be applied to the clock inputs of various devices within the system 11 the operation of which are dependent upon the completion of the processing of each word. The use of the clock signal (C) will be hereinafter described in detail except in those instances where its use and function will be obvious to one skilled in the art. The output of T register 39 is applied to the inputs of I gate 45 (2nd word), J gate 47 (3rd word), record length gate 49 (4th word) and to record type selector 51 (5th word). The output of T register 39 is also applied directly to the inputs of long vector device 53, short vector device 55 and to character device 57. The control signals from record type selector 51 are respectively applied to the gate inputs of long vector device 53, short vector device 55 and character device 57. The outputs of each long vector device 53, short vector device 55 and character device 57 are applied to the inputs of I register 59 and J register 61 as illustrated.

The output of I gate 45 is applied to the input of I register 59 and the output of J gate 47 is applied to the input of J register 61. The output of record length gate 49 is applied to the input of record length detector 63. The outputs of controller 43 are respectively applied to the inputs of I gate 45, J gate 47, record length gate 49 and record type selector 51.

The output of I register 59 is connected though I plane selector 65 to the three memory planes 67, 69 and 71. Memory plane 67 is for red activations, memory plane 69 is for green activations and memory plane 71 is for blue activations.

The output of J register 61 is connected through J plane selector 73 to the three memory planes 67, 69 and 71. Memory plane selector control 75, which may be manually operated, selects one or more of the memory planes 67, 69 and 71 to which the I and J signals will be applied. The selected memory planes determine the color of subsequent presentation. In actual practice the video control unit 35 will include I plane selector 65, J plane selector 73 and control 75. However, if only black and white presentation is desired then a single memory plane could be used and the output of the memory interface processor would be addressed to the input of a single memory plane and then read out to the video display by conventional addressing and synchronizing control techniques.

Figures 28, 30:
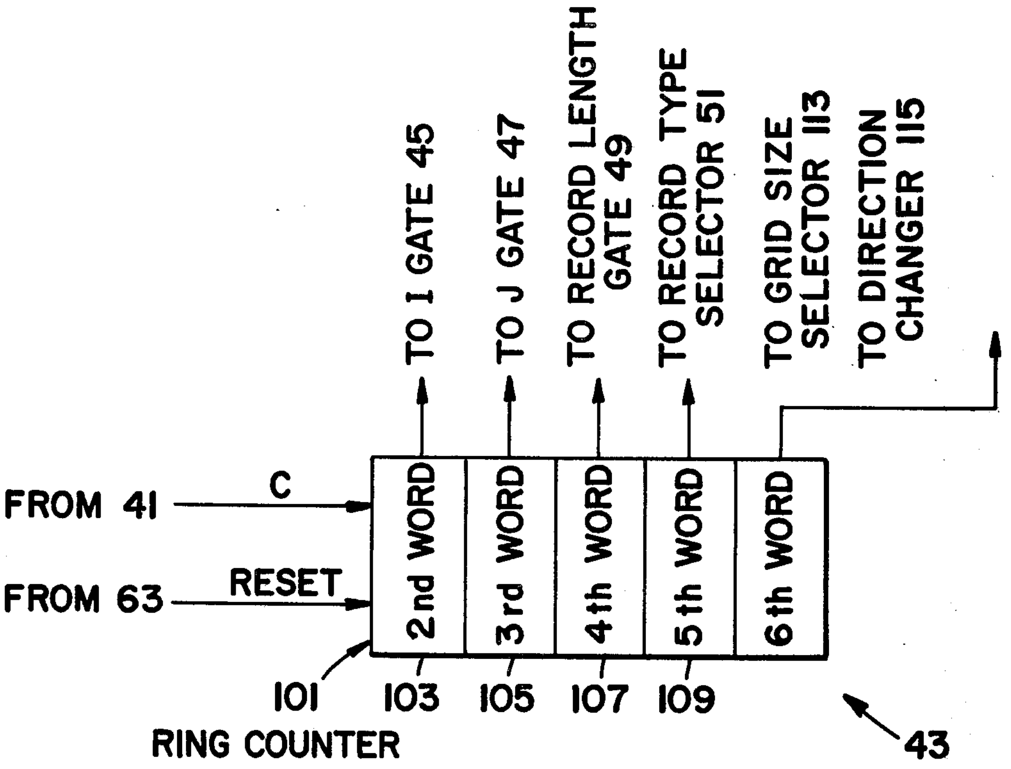
FIG. 28 is a schematic diagram of the controller used in the interface processor of FIG. 27.
FIG. 30 is a chart that illustrates all possible conditions of operation of the direction changer of FIG. 29.

In FIG. 28 is illustrated the details of the controller 43 of FIG. 27. Controller 43 comprises a ring counter 101 having a plurality of stages that may be flip-flops or the like. Ring counter 101 will receive a clock signal (C) from word dector 41 upon the completion of the 16-bit synchronous signal or 1st word, and for subsequent words that are processed.

Upon the completion of the first word a clock signal (C) from word detector 41 is provided which shifts the second word into buffer 13 from general data storage 17, and through information processor 15. It will be obvious to one skilled in the art that the clock signal (C) from word detector 41 will be used for many control purposes such as in the timing control of buffer 13, information processor 15 and general data storage 17. However, since these control operations are well known to those skilled in the art a detailed discussion thereof is not presented.

Upon the occurrence of the second word (or the completion of the first word) a clock pulse or signal (C) is obtained from word detector 41 that sets the first stage flip-flop 103 of ring counter 101. This provides an output signal that is applied to I gate 45. I gate 45 will then transfer the 12-bit I word from T register 39 to I register 59. Upon the completion of this transfer the word detector 41 will provide another clock signal (C) which will cause the transfer of the third word into T register 39. Simultaneously this clock signal (C) will be applied to the clock input of ring counter 101 which will return stage 103 to zero and set the next stage 105. The output of stage 105 is applied to J gate 47. J gate 47 will then transfer the 12-bit J word from T register 39 to J register 61. Upon the completion of this transfer when word detector 41 will provide another clock signal (C) which will cause the transfer of the fourth word into T register 39. Simultaneously this clock signal (C) will be applied to the clock input of ring counter 101 which will return stage 105 to zero (stage 103 remains at zero) and set the next stage 107. The outpt of stage 107 is applied to record length gate 49. Record length gate 49 will then transfer the 8-bit word from T register 39 to record length detector 63. Upon the completion of this transfer word detector 41 will provide another clock signal (C) which will cause the transfer of the fifth word into T register 39. Simultaneously this clock signal (C) will be applied to the clock input of ring counter 101 which will return stage 107 to zero (stages 103 and 105 remain at zero) and set the next stage 109. The output of stage 109 is applied to record type selector 51 of FIG. 27, to grid size selector 113 of FIG. 29 and to direction changer 115 also of FIG. 29. This will result in the transfer of the record type code (2 bits) into record type selector 51 of FIG. 27, the transfer of the grid site code (2 bits) into grid size selector 113 of FIG. 29, and the transfer of the initial direction code (4 bits or 3 bits and 1 zero fill for $A_1AHd\ 2A_3$) into direction changer 115 of FIG. 29. Upon the completion of these transfers the word detector 41 will provide another clock signal (C) which will cause the transfer of the sixth word into T register 51.

Referring to FIG. 27 it should be noted that record type selector 51 will turn on (by gate pulse G) either long vector device 53, or short vector device 55 or character device 57 as dictated by the 2-bit character type code contained in the fifth word. It should be noted that the particular device that is turned on by record type selector 51 will remain on until the completion of the long vector, or short vector, or character message. The completion of the message is detected by record length detector 63 of FIG. 27 which will then provide a reset signal that will be applied to the various other devices in the system that need to be reset upon the completion of the message. The system is then ready to receive the next message.

Figure 29:
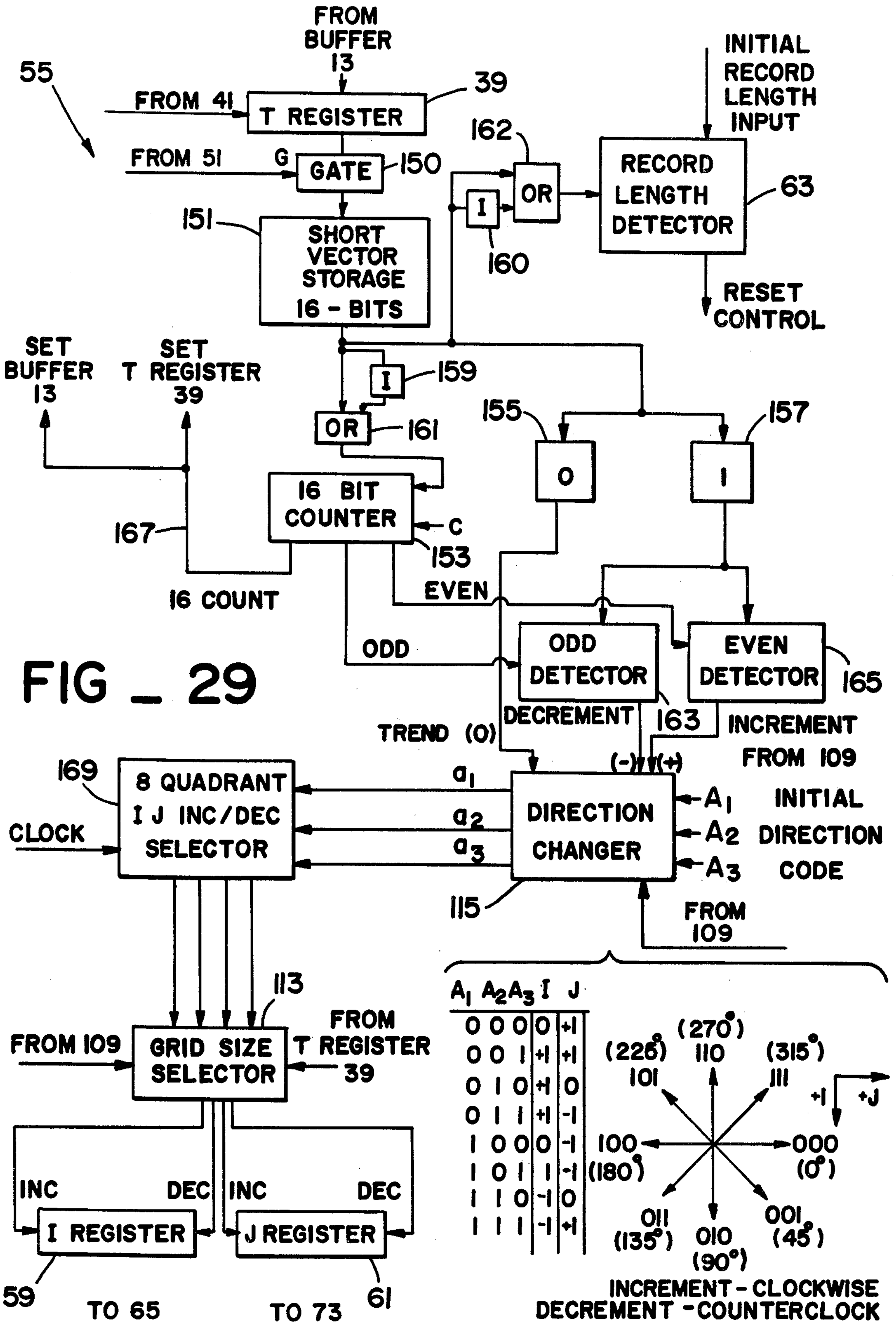
FIG. 29 illustrates the detailed logic of the short vector device of FIG. 27.

In FIG. 29 is illustrated the short vector device 55 of FIG. 27. The gate signal G from record type selector 51 is applied to gate 150. Therefore, the 16-bit short vector record word (sixth word of FIG. 26) is transferred from T register 39 to 16-bit short vector storage 151. The information in short vector storage 151 is serially transferred out, bit-by-bit, to the inputs of counter 153, to record length detector 63, to "O" detector 155, and to "1" detector 157.

The input of counter 153 includes inverter 159 and OR gate 161 to provide a count of both 1's and 0's. That is, the output of short vector storage 151 is directly applied to one input of OR gate 161 and through inverter 159 to the other input of OR gate 161. Therefore, when a "1" occurs it will be passed directly through OR gate 161 to the input of counter 153 and when a "0" occurs then inverter 159 will provide an output that will be applied through OR gate 161 to the input of counter 153 and be counted in the same manner as the "1's" are counted. The input of record length detector 63 includes inverter 160 and OR gate 162 to provide a count of both 1's and 0's in the same manner as described with respect to inverter 159 and OR gate 161.

The output of "0" detector 155 is applied to the trend (0) input of direction changer 115 and the output of "1" detector 157 is applied in parallel to ODD detector 163 and EVEN detector 165. The output of ODD detector 163 is applied to the decrement input (−) of direction changer 115 and the output of EVEN detector 165 is applied to the increment (+) input of direction changer 115. The initial direction of the initial vector is determined by the three-bit binary representations $A_1A_2A_3$ as previously explained and as illustrated in FIG. 29. The three outputs $a_1a_2a_3$ of direction changer 115 are three binary bits. For the initial vector $A_1A_2A_3 = a_1a_2a_3$. For subsequent vectors the $a_1a_2a_3$ outputs will be modified by the output of ODD detector 163 and EVEN detector 165 as explained below.

Direction changer 115 is a conventional binary adder/subtractor and its construction will therefore not be described in detail. However, the direction changer will provide a 3-bit $a_1a_2a_3$ output that will define the direction of the next adjacent vector as illustrated in the diagram of FIG. 29 annd the chart shown in FIG. 30. For example, if the direction of the initial short vector had been 135° or $A_1A_2A_3$=011 then if the next short vector bit was a "0" then the next adjacent vector (second or EVEN bit) would have the same trend direction (0° angle change) of $a_1a_2a_3$=011. However, if the second vector has been represented by a "1" then the direction changer 115 would be increment (+) by the output of EVEN detector 165 and the 3-bit binary representation of the direction of the second bit (which is even) would be $a_1a_2a_3$=100 which is 180° or 45° clockwise with respect to the initial vector of 135°.

If the direction of the last vector had been $a_1a_2a_3$=011 and the last vector was an EVEN vector then the next vector would be an ODD vector. If this ODD vector were represented by a "0" bit then it would have the same direction and $a_1a_2a_3$=011. However, if it had been represented by a "1" then the direction changer 115 would be decremented (−) by the output of ODD detector 163 and the 3-bit binary representatin of the direction of this bit (which is ODD and may be the 3rd, 5th, 7th, etc., bit) would be $a_1a_2a_3$=010 which is 90° or 45° counterclockwise with respect to the last vector having a direction of 135°. These functions are shown in the diagrams associated with FIG. 29.

In FIG. 30 is a chart that illustrates all possible conditions of operation of direction changer 115. The first column indicates the direction $A_1A_2A_3$ of the last vector which may be the initial vector when examining the second bit. The next three columns represent the direction $a_1a_2a_3$ of the next adjacent vector under either the trend (ODD or EVEN bit is "0"), or the decrement (ODD bit is "1"), or the increment (EVEN bit is "1") conditions.

From FIG. 29 it can be seen that the counter 153 counts the serial bit by bit output of short vector storage 151. Counter 153 is conventional and may comprise a plurality of series connected flip-flop stages wherein a pulse indicating a count of 16 bits (on the last stage output, for example) is provided on line 167 to shift the next word (16 bits) into buffer 13 and T register 39. It should be noted also that the first stage of counter 153 will provide an ODD-EVEN representation. The ODD output (representing the ODD bits, that is the 1st, 7th, 29th, 159th, etc., bits) is applied to ODD detector 163. The EVEN output (representing the EVEN bits 2nd, 44th, 156th, etc.) is applied to EVEN detector 165.

For purpose of illustration and understanding, in FIG. 29 the "0" and "1" detectors are illustrated by blocks 155 and 157. However, it should be noted that in practice that "1" detector 157 could be a hard wire connection between the output of short vector storage 151 and the inputs of ODD detector 163 and EVEN detector 165. It should be noted that direction changer 115 is not incremented or decremented when a "0" is detected. That is, the next vector (whether EVEN or ODD) always remains in the same or trend direction. In actual practice "0" detector 155 could be eliminated and there would be no trend (0) input to direction changer 115. In addition, there are other forms of logic that could be used to implement the above described basic requirements of incrementing direction changer 115 when the bit is EVEN and decrementing it when the bit is ODD. In addition to the above, the system could be modified so that it would decrement when the bits are ODD and increment when the bits are EVEN. This would require a corresponding modification of the incoming short vector information.

Figure 31:
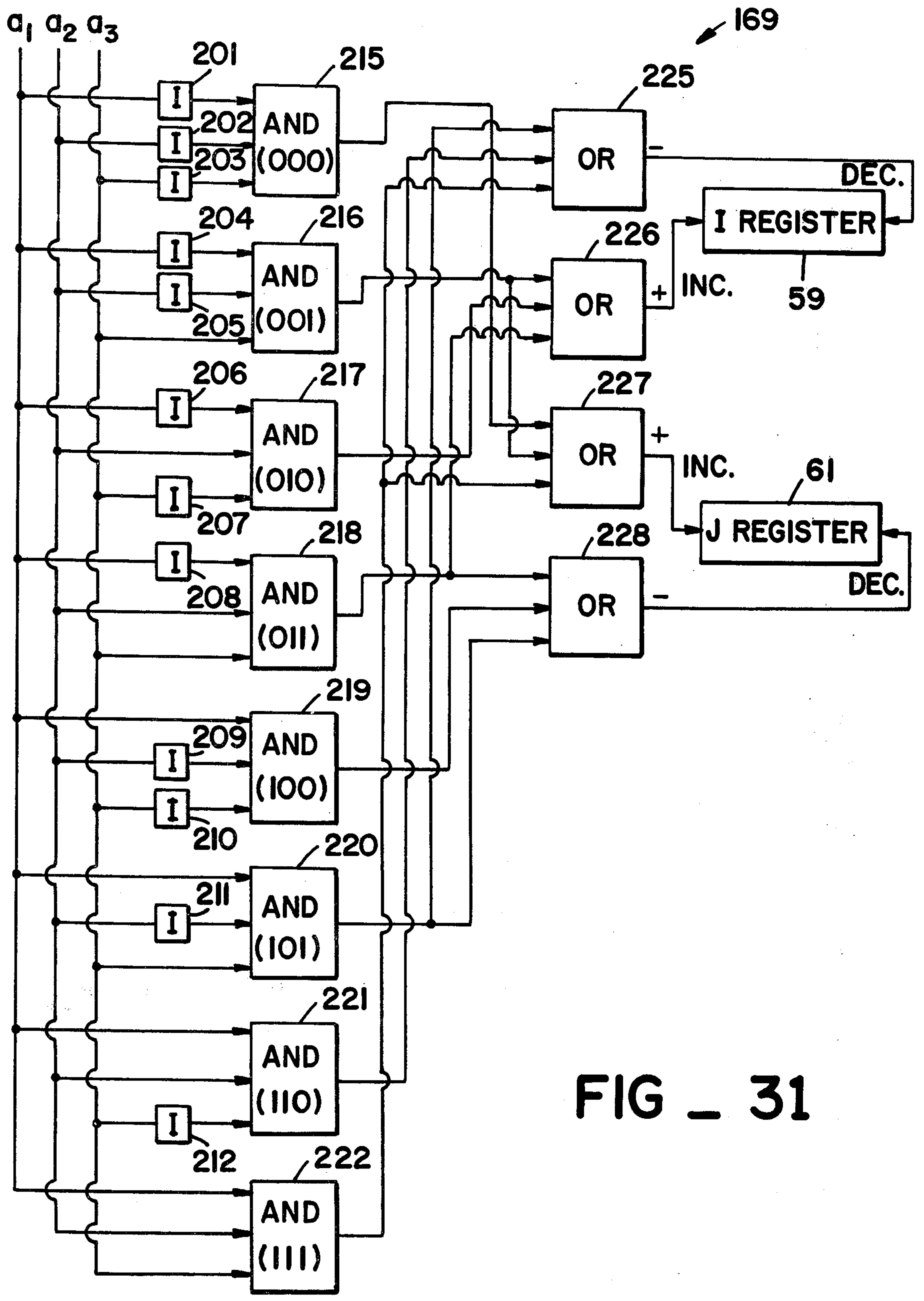
FIG. 31 illustrates the detailed logic of the 8 quadrant selector of FIG. 29.

The outputs of direction changer 115 are applied to the inputs of 8 quadrant selector 169, the outputs of which are applied through grid size selector 113 to the increment and decrement inputs of I register 59 and J register 61. In FIG. 31 are illustrated the details of 8 quadrant selector 169. Quadrant selector 169 includes a plurality of inverters 201 through 212, AND gates 215 through 222 and OR gates 225 through 228. The outputs of OR gates 225 and 226 are connected to the decrement and increment inputs, respectively, of I register 59. The outputs of OR gates 227 and 228 are connected to the increment and decrement inputs, respectively, of J register 61.

The $a_1a_2a_3$ outputs of direction changer 115 of FIG. 29 are connected through the inverters 201 through 212, or directly to the inputs of AND gates 215 through 222 as shown in FIG. 31. The connections are made to implement the previously discussed direction logic and correspond with charts shown in FIGS. 29 and 30. That is, if $A_1A_2A_3$ or $a_1a_2a_3$=000, then I=0 and J=+1. Therefore, $a_1a_2a_3$=000 are applied through inverters 201, 202 and 203 to the inputs of AND gate 215. Therefore, an output will be provided from AND gate 215 which represents $a_1a_2a_3$=000 and will be applied through OR gate 227 to the increment (+) input of J register 61 as required. As another example assume $a_1a_2a_3$=011 then I=+1 and J=−1. Therefore, $a_1$ is applied through inverter 208 to the input of AND gate 218 along with the $a_2$ and $a_3$ inputs. Therefore, when $a_1a_2a_3$=011, AND gate 218 will provide an output that is applied through OR gates 226 and 228 respectively to the increment input of I register 59 and to the decrement input of J register 61 as required. AND gates 215 through 222 are connected as shown in FIG. 31 to provide the 3-bit logic that results in that particular AND gate providing an output signal that in turn will activate the increment and decrement inputs of I register 59 and J register 61 as required by the system logic.

Upon the completion of the last bit of the record (which is both the end of record and the end of message) record length detector 63 of FIGS. 27 and 29 will provide a reset signal. This will prepare the system for receipt of the next incoming message which may be a long vector message, a character message or another short vector message. As previously explained, the 4th word of the short vector message is an 8-bit binary representation of the record length (6th through nth words) and it is loaded into record length detector 63. Upon the occurrence of each bit of the record the loaded record length is reduced by the count of one. When the loaded record length is reduced to zero by the last bit of the record then the record length detector 63 provides the above described reset signal. Record length detector 63 may be a conventional binary substraction device the details of which are well known to those skilled in the art.

It should be noted that the completion of the short vector record may result in the plotting a complete curve (such as shown in FIG. 23) or it may describe or plot only a section of the total curve. For example, it may require several messages to describe and plot the entire curve shown in FIG. 2. This is because it is generally desirable to limit any given message length for reasons of efficiency and accuracy. Moreover, parts of a curve (small angular changes) may be more efficiently transmitted using a large grid size and a smaller number of record bits whereas other parts of the curve (large angular changes) are preferably defined by use of the small grid size to more accurately depict the curve. However, it is to be understood that an entire curve may be transmitted in a single long message.

The details of character device 57 of FIG. 27 are shown and described with respect to FIGS. 32A, 32B and 32C. As previously explained the complete message may include a long vector record, a short vector record and a character record. The character message will be reorganized in a manner that is similar to the short vector reorganized message of FIG. 26. However, the character message will not include a definition of the initial direction in the 5th word since it is not used in the character message. The binary definition of the characters is contained in 8-bit words. For example, in FIG. 2 is illustrated the character groupings of ISOBAR and GRAPH. The work ISOBAR is positioned above the word GRAPH. The (I,J) starting grid point of ISOBAR is illustrated as $(I,J)_5$ and the starting grid point of GRAPH is illustrated as $(I,J)_7$.

As shown in FIG. 32A the gate signal G from record type selector 51 of FIG. 27 is applied to gate 250. Four words of 16-bits each are sequentially transferred from T register 39 into read only memory 251. When the four 16-bit words have been transferred the counter 252 provides an output signal S which is used for subsequent control. The four 16-bit words (64 bits) define a single character which is represented on an $8 \times 8$ grid.

In the example discussed below it is assumed that the character being reproduced is the first letter I of the word group ISOBAR of FIG. 2 which has its starting point defined as $(I,J)_5$. In this example it also should be noted that the characters in the first character record will be the 6 characters in the word ISOBAR with a starting point of $(I,J)_5$ and the characters in the second record will be the 5 characters in the word GRAPH with a starting point of $(I,J)_7$. The other set of inputs to read only memory 251 is the address which is a 3-bit word $A_1A_2A_3$ defined by 8-bit decoder 253. The character I, as well as all of the other characters, is represented on an $8 \times 8$ grid as shown in FIGS. 32B and 32C. The distance between grid lines are the same for the characters, short vectors and long vectors. However, they also may be in multiples to define larger characters. In FIG. 32B the character I is shown by large circles (surrounding each activated grid intersection) and in FIG. 32C by the binary numer "1". The read only memory 251 contains 8 groups of 8-bit words that define the particular character. For example, the character I has the 8-bit binary groupings illustrated in FIG. 32C.

The addresses of the subsequent 8-bit groupings are as defined in FIGS. 32B and 32C. Upon the occurrence of the S signal from counter 252 the first 8-bit group is shifted from address $A_1A_2A_3=000$ in read only memory 251 to shift register 254. The address is determined by decoder 253 the address of which will sequentially progress through the eight 8-bit words as hereinafter described. During the $A_1A_2A_3=000$ word shift register 254 will serially shift the 8-bits (00000000) out of shift register 254 on line 255 through OR gate 257 to the increment input of J register 61. This will result in scanning each of the eight bits at each point on the 000 line of the grid of FIG. 32B as shown by the arrows moving from left to right.

Line 255 from shift register 254 is also applied to the input of OR gate 259 and to the input of inverter 261 which is connected to OR gate 259. Line 263 from shift register 254 is applied to the decrement input of J register 61, to the other input of OR gate 259 and to the input of inverter 265 the output of which is connected to OR gate 259. The output of OR gate 259 is connected to the input of 8-unit counter 267 the output of which is connected to the clock input of read only memory 251, to the clock input of 8-bit decoder 253, to the decrement input of I register 59, and to the input of 8-unit counter 269. The output of counter 269 is connected to the gate input of gate 271.

The function of gate 271 is to permit the clock signal C to be applied to the clock input of ring counter 273. It should be noted that the clock signal C applied through gate 271 to ring counter 273 may be the same as the clock signal C applied to shift register 254. Ring counter 273 has nine stages or flip-flops. The first eight stages are connected to the inputs of OR gate 275 the output of which is connected to the increment input of I register 59 and to one input of OR gate 277. The last or ninth stage of ring counter 273 is connected to the other input of OR gate 277 and to the input of record length detector 63 which is shown in both FIG. 32A and FIG. 27. The output of OR gate 277 is applied to the increment input of J register 61 through OR gate 257.

The operation of the character device 57 is as follows. As previously explained the first 8-bit word 00000000 (representing $A_1A_2A_3=000$) is shifted bit-by-bit on line 255 through OR gate 257 to the increment input of J register 61. The same 8 zeros will be inverted by inverter 261 and applied to one input of OR gate 259 the output of which will be applied to the input of 8-unit counter 267. At the end of the 8-bit word a signal from counter 267 will be applied to the clock input of read only memory 251, to the decrement input of I register 59 and to the input of 8-unit counter 269. The second 8-bit word 00011100 (representing $A_1A_2A_3=011$) will be then shifted into shift register 254. Referring to FIG. 32B it can be seen that the J register has been incremented 8 times (which means the $A_1A_2A_3=000$ line) and the I register has been decremented once to establish the starting position at the right most position in the $A_1A_2A_3=001$ line. The process is now repeated only the internal control of shift register 254 causes the output of shift register to appear on the decrement J line 263. The internal control, for example, may be a control flip-flop responsive to the shift of the next 8-bit word from memory 251. Therefore the eight points in the $A_1A_2A_3=001$ position will be scanned from right to left. It can be seen from FIG. 32C that 1's will appear at the 6th, 5th and 4th positions of the 8-bit word. Therefore, the equivalent positions of the selected memory plane of FIG. 27 will be activated. This is because the memory planes are activated by gating out from the I and J registers only when the binary number is a "1" by means of "1" responsive read only gates, not shown. This process will be repeated for the remaining 6 lines as indicated in FIGS. 32B and 32C. Therefore, the positions in the selected memory plane will be activated to illustrate the letter I as shown in FIG. 32B.

At the end of the last line ($A_1A_2A_3=111$) then 8 unit counter 269 will provide an output signal that will turn on gate 271. When gate 271 is turned on then the clock signal will be applied to ring counter 273 and the output of OR gate 275 will increment I register 8 times and also increment J register 8 times. Upon the occurrence of the ninth clock pulse J register will be incremented another time. Therefore, a new starting point is established at $(I,J)_6$ of FIG. 2 and a new character may be read into read only memory 251 from T register 39. The process is repeated for each of the remaining letters of the word ISOBAR.

For the word GRAPH a new character message is necessary to establish the new starting point at $(I,J)_7$. The above defined process for the word ISOBAR is then repeated for the word GRAPH.

Figure 33:
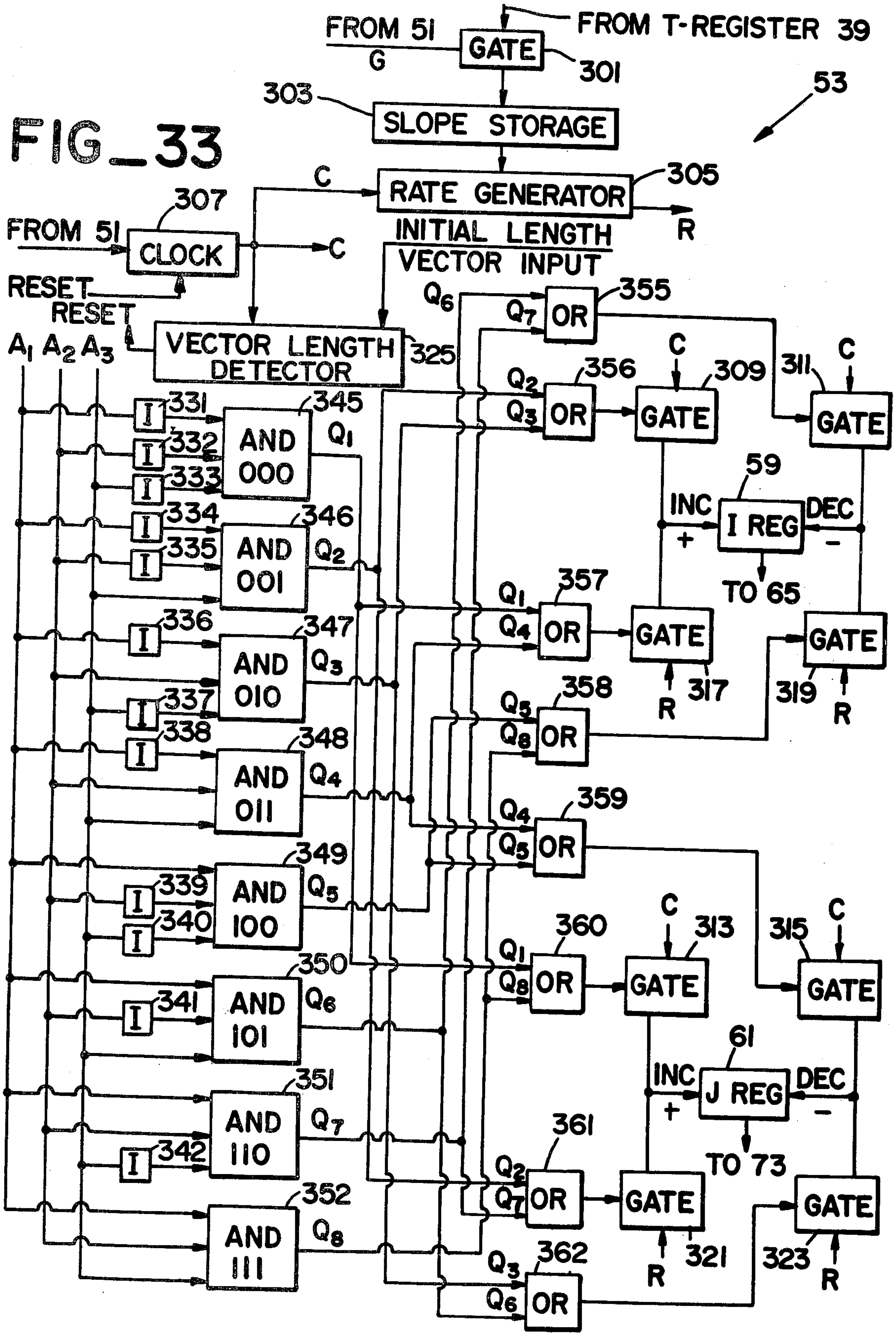
FIG. 33 illustrates the detailed logic of the long vector device of FIG. 27.
Figure 34:
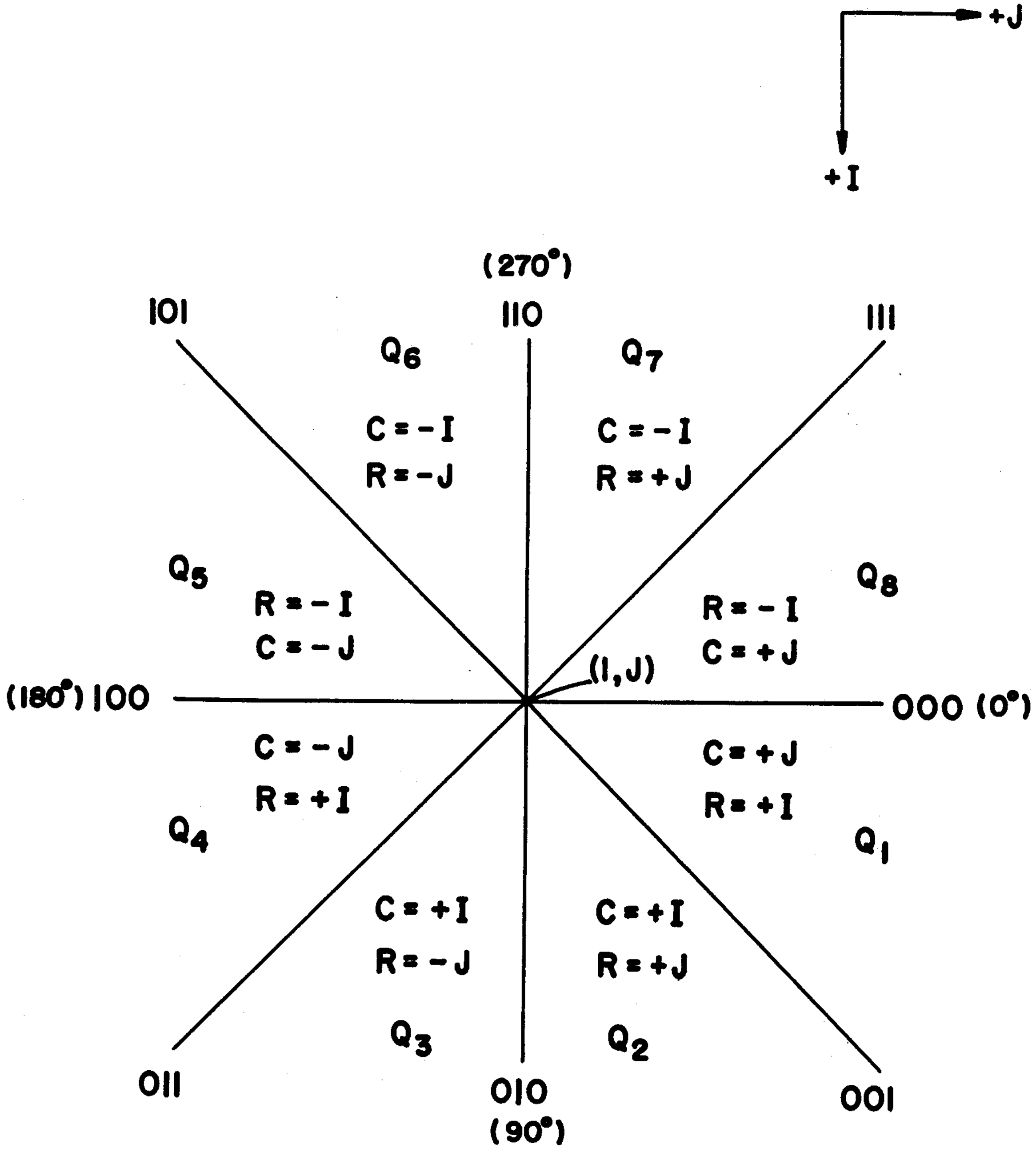
FIG. 34 is a quadrant diagram that depicts the concept and operation of the long vector logic device of FIG. 33.
Figure 35:
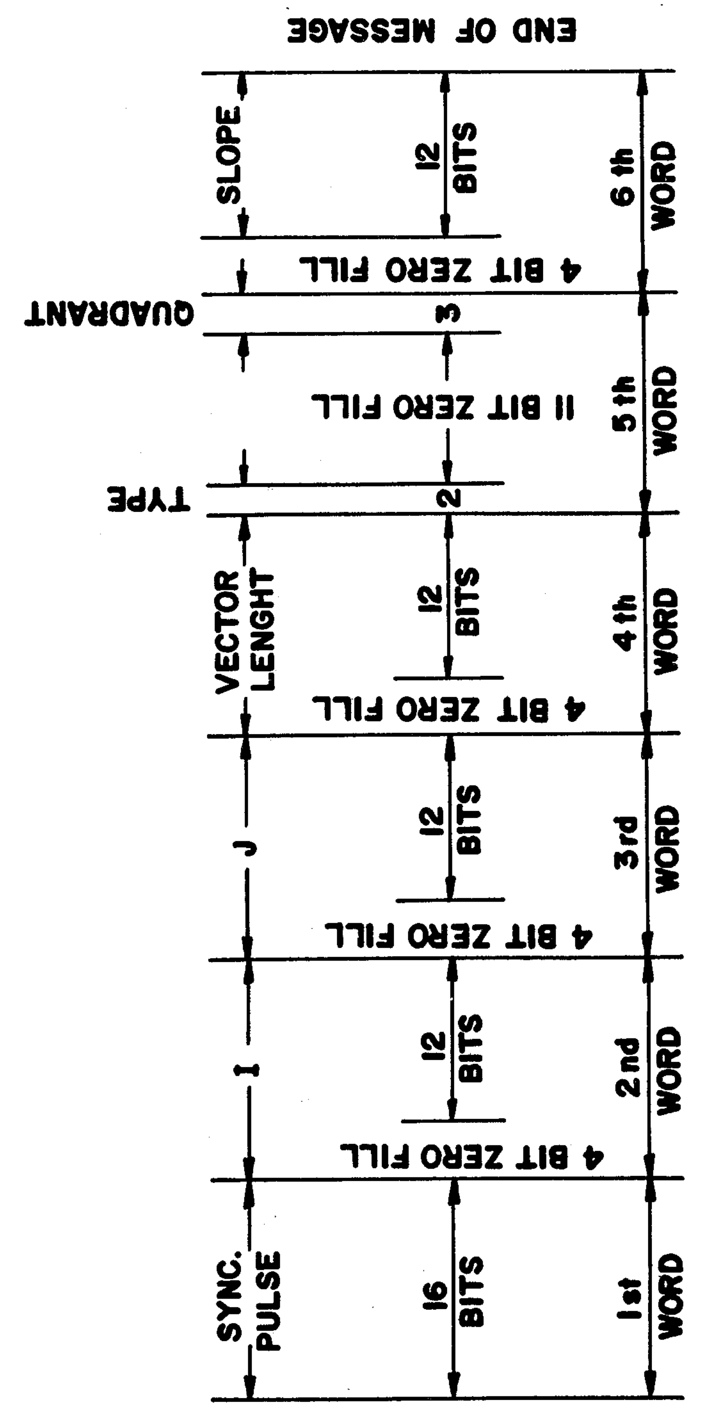
FIG. 35 is a diagram of the long vector reorganized message used in the long vector device in FIGS. 33 and 34.

In FIG. 33 is illustrated the long vector device 53 of FIG. 27. In FIG. 34 is illustrated a sector diagram and in FIG. 35 is illustrated the long vector reorganized message both of which are presented to illustrate the operation of the long vector device 53 of FIG. 33. The output signal from record type selector 51 of FIG. 27 is applied to gate 301. Therefore, the 12-bit (16-bits with 4-bits of zero fill) (6th word of FIG. 35) is transferred from T register 39 to a conventional 12-bit slope storage device 303. The output of slope storage device 33 is applied to the input of a conventional rate generator 305. Clock 307 provides an output signal (C) that is applied to the input of rate generator 305. The clock signal (C) from clock 307 is also applied to the inputs of gates 309 and 311 that are respectively connected to the increment and decrement inputs of I register 59 and to the inputs of gates 313 and 315 that are respectively connected to the increment and decrement inputs of J register 61. The output signal (R) from rate generator 305 is applied to the inputs of gates 317 and 319 that are respectively connected to the increment and decrement inputs of I register 59 and to the inputs of gates 321 and 323 that are respectively connected to the increment and decrement inputs of J register 61. The output signal (C) from clock 307 is also applied to the input of vector length detector 325 which has the vector length (4th word of FIG. 35) set into its register. The clock signal (C) will be counted and when it has a count equal to the vector length then vector length detector 325 will provide a reset signal that will stop clock 307 and will reset the rest of the system for processing of the nextmessage.

The 3-bit binary representation of the sector (5th word of FIG. 35) is represented by $A_1A_2A_3$ and is applied to the inputs of inverters 331 through 342 and AND gates 345 through 352 as illustrated in FIG. 33. The outputs of AND gates 345 through 352 are applied to the inputs of OR gates 355 through 362 as illustrated. It should be noted that the outputs of AND gates 345 through 352 are represented by the symbols $Q_1$ $Q_2$ $Q_3$ $Q_4$ $Q_5$ $Q_6$ $Q_7$ and $Q_8$ respectively. These $Q_1$ through $Q_8$ symbols correspond with the $Q_1$ through $Q_8$ symbols of FIG. 34 and represent the 8 possible sectors in a 360° angle. The outputs of OR gates 355 through 362 are respectively applied to the inputs of gates 309 through 323 as illustrated. These signals function to gate the increment and decrement inputs of I register 59 and J register 61 with the clock (C) and rate (R) signals in a preselected manner in order to define any long vector within a 360° angle and for any preselected length.

At the outset it should be noted that it is desirable to start at an initial (I,J) point and reproduce a straight line long vector at any angle of a 360° circle. That is, in FIG. 34 the initial (I,J) point is at the center of the diagram and the long vector must extend from that point in any direction for a preselected distance or length. The preselected length is determined by inserting the vector length (4th word) into vector length detector 325 of FIG. 33 and then subtracting each vector clock pulse (C) from the vector length. At the end of the vector length a reset signal is provided which prevents clock 307 from providing further output signals and resets the system.

When the 6th word of the long vector reorganized message of FIG. 35 is processed, gate 301 has been opened by record type selector 51 of FIG. 27 and the slope of the long vector (6th word) is transferred into slope storage device 303. The slope is represented by a binary number the degree of resolution being determined by the number of bits. It has been found that a 12-bit word is sufficient for providing the required resolution of a 45° arc. It has been also found that the angle may be determined by the use of a clock signal (C) that is applied to the input of a rate generator that provides an output rate pulse (R) that is proportional to the preselected angle determined by the 12-bit word. Referring to FIG. 34, assuming a small angle, 1° for example, is required for the long vector, then the 12-bit slope code is selected so that rate generator 305 will provide a single rate pulse (R) for a preselected number of clock pulses (C). For 1° the number of clock pulses (C) for one rate pulse would be about 57, for 5° it would be about 13, and for 45° it would be exactly one clock pulse (C) for each rate pulse (R). It should be notedthat this provides all of the desired angles within the first 45° sector $Q_1$. From FIG. 34 it can be seen that all angles within the first sector $Q_1$ are represented by both an increment to the I register 59 and an increment to the J register 61. This is achieved by providing a 3-bit code of $A_1A_2A_3=000$ in the 5th word which provides an output from AND gate 345 which turns on gates 317 and 313. Since gate 313 is on, the clock signal (C) is applied to the increment input of J register 61, and since gate 317 is on, the rate signal (R) is applied to the increment input of I register 59. The (I,J) points are sequentially transferred to the appropriate memory plane 67, 69 and 71 of FIG. 27 until the full length of the long vector has been plotted. The plotting of this long vector is completed when vector length detector 325 provides a reset signal as previously described.

It should be particularly noted that the next sector ($Q_2$) is plotted from the 90° line and not the 45° line. That is, the 12-bit code must be selected so that the actual angle of 89° is coded as 1° and $A_1A_2A_3=001$ which defines sector $Q_2$. This means that there will be a large number of clock signals (C) that are applied to the increment input of I register 59 for each rate signal (R) that is applied to the increment input of the J register 61. From FIG. 33 it can be seen that this is achieved by providing a signal from AND gate 346 that turns on clock gate 309 and turns on rate gate 321. This is the reverse of the gating for the $Q_1$ sector. FIGS. 33 and 34 illustrate the proper gatings of the clock (C) and rate (R) signals to the increment and decrement inputs of the I and J register 59 and 61 for the remaining six sectors. It should be particularly noted, however, that all of the plotting for the long vectors are taken from the 0°, 90°, 180°, 270° and 360° (0°) reference lines and not from the 45°, 135°, 225° and 315° reference lines.

In view of the foregoing description it can be seen that the present invention provides an effective and reliable alphanumeric and graphic display system.

What is claimed is:

1. A digital plotting system comprising:

(a) a processor for processing a binary coded signal representing predetermined graphic information representing a straight line within a rectangular coordinate system having first and second mutually orthogonal coordinate lines and said coded signal including information defining the initial starting point, the length, the sector and the slope of said straight line;

(b) said processor including an I register for defining one coordinate of the rectangular coordinate system and a J register for defining the other coordinate of said rectangular coordinate system wherein each of said I and J registers includes increment and decrement inputs;

(c) said processor including first means operatively connected to said I and J registers for loading the initial starting point of said straight line of said predetermined graphic information in said I and J registers;

(d) said processor including second means for storing the length of said straight line of said predetermined graphic information representing a straight line;

(e) said processor including third means for sensing the particular sector of an 8 sector definition of a circle described about said initial starting point;

(f) said processor including fourth means for providing rectangular coordinate output signals that define the straight line and its slope within any one of said 8 sectors;

(g) the output of said second means operatively connected to said fourth means for terminating the output signal of said fourth means when the length of said line has been obtained; and (h) said third means comprises a plurality of decoders for decoding the sector information of said coded signal and selecting the increment and decrement inputs of said I and J registers for receiving the output signals from said fourth means for plotting the straight line and its slope from only said first coordinate line or from said second coordinate line.

2. The system of claim 1 wherein:

(a) said fourth means comprises a clock, a rate generator and a slope storage device;

(b) the output of said clock providing a clock signal that is connected to the input of said second means and to one input of said rate generator;

(c) the output of said slope storage device being connected to the other input of said rate generator; whereby (d) the output of said rate generator is a rate signal that is a function of said clock rate and the slope definition stored in said slope storage device.

3. The system of claim 2 wherein:

(a) said third means includes first, second, third, fourth, fifth, sixth, seventh and eighth decoders sequentially and respectively representing the first, second, third, fourth, fifth, sixth, seventh and eighth sectors of a circle; and (b) logic means responsive to the output of said decoders for selecting the increment and decrement inputs of said I and J registers.

4. The system of claim 3 wherein:

(a) said logic means includes first, second, third, fourth, fifth, sixth, seventh and eighth OR gates, first and second I register clock gates and first and second I register rate gates, first and second J register clock gates and first and second J register rate gates.

5. The system of claim 4 wherein:

(a) said first I register clock gate and said first I register rate gate are connected to the increment input of said I register.

6. The system of claim 5 wheren:

(a) said second I register clock gate and said second I register rate gate are connected to the decrement input of said I register.

7. The system of claim 6 wherein:

(a) said first J register clock gate and said first J register rate gate are connected to the increment input of said J register.

8. The system of claim 7 wherein:

(a) said second J register clock gate and said second J register rate gate are connected to the decrement input of said J register.

9. The system of claim 8 wherein:

(a) the output of said sixth and seventh decoders are connected to the input of said first OR gate the output of which is connected to the gate input of said second I register clock gate.

10. The system of claim 9 wherein:

(a) the output of said second and third decoders are connected to the input of said second OR gate the output of which is connected to the gate input of said first I register clock gate.

11. The system of claim 10 wherein:

(a) the output of said first and fourth decoders are connected to the input of said third OR gate the output of which is connected to the gate input of said first I register rate gate.

12. The system of claim 11 wherein:

(a) the output of said fifth and eighth decoders are connected to the input of said fourth OR gate the output of which is connected to the gate input of said second I register rate gate.

13. The system of claim 12 wherein:

(a) the output of said fourth and fifth decoders are connected to the input of said fifth OR gate, the output of which is connected to the gate input of said second J register clock gate.

14. The system of claim 13 wherein:

(a) the output of said first and eighth decoders are connected to the input of said sixth OR gate, the output of which is connected to the gate input of said first J register clock gate.

15. The system of claim 14 wherein:

(a) the output of said second and seventh decoders are connected to the input of said seventh OR gate the output of which is connected to the gate input of said first J register rate gate.

16. The system of claim 15 wherein:

(a) the output of said third and sixth decoders are connected to the input of said eighth OR gate the output of which is connected to the gate input of said second J register rate gate.

17. A digital plotting system comprising:

(a) a processor for processing a binary coded signal representing predetermined graphic information representing a straight line within a rectangular coordinate system having a first and second mutually orthogonal coordinate lines and said coded signal including information defining the initial starting point, the length, the sector and the slope of said straight lines;

(b) said processor including first means for loading the initial starting point of said straight line in said rectangular coordinate system of said predetermined graphic information;

(c) said processor including second means for storing the length of said straight line of said predetermined graphic information representing a straight line;

(d) said processor including third means for sensing the particular sector of an 8 sector definition of a circle described about said initial starting point;

(e) said processor including fourth means for sensing the slope of the straight line within any one of said 8 sectors and providing rectangular coordinate output signals defining the straight line within that sector;

(f) the output of said second means operatively connected to said fourth means for terminating the output signals of said fourth means when the length of said line has been obtained;

(g) said processor including an I register having increment and decrement inputs for defining one coordinate of the rectangular coordinate system and a J register having increment and decrement inputs for defining the other coordinate of said rectangular coordinate system;

(h) said second means comprises a line length binary storage and decrement device; p1 (i) said fourth means comprises a clock, a rate generator and a slope storage device;

(j) the output of said clock connected to the decrement input of said line length binary storage and decrement device and to one input of said rate generator;

(k) the output of said slope storage connected to the other input of said rate generator; whereby (1) the output of said rate generator is a rate signal that is a function of said clock rate and the slope definition stored in said slope storage; and (m) said third means selectively applying the outputs of said clock and rate generator to the increment and decrement inputs of said I and J registers for plotting the slope of the straight line from only said first coordinate line or from said second coordinate line.

* * * * *